United States Patent
Asano et al.

(10) Patent No.: US 7,761,220 B2
(45) Date of Patent: Jul. 20, 2010

(54) FUEL CONTROL SYSTEM OF INTERNAL COMBUSTION ENGINE

(75) Inventors: Seiji Asano, Hitachinaka (JP); Mitsuru Nagase, Hitachinaka (JP); Hiroshi Sekine, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 283 days.

(21) Appl. No.: 12/108,157

(22) Filed: Apr. 23, 2008

(65) Prior Publication Data

US 2008/0270006 A1 Oct. 30, 2008

(30) Foreign Application Priority Data

Apr. 24, 2007 (JP) ............................. 2007-114569

(51) Int. Cl.
*G06F 19/00* (2006.01)
*F02D 41/04* (2006.01)
*F02M 51/00* (2006.01)

(52) U.S. Cl. .................. 701/104; 123/480; 123/492

(58) Field of Classification Search .............. 123/325, 123/326, 435, 436, 478, 480, 486, 491–493; 701/101–105, 113, 115

See application file for complete search history.

(56) References Cited

U.S. PATENT DOCUMENTS

| | | | | |
|---|---|---|---|---|
| 4,919,094 A | * | 4/1990 | Manaka et al. | 123/493 |
| 5,031,597 A | * | 7/1991 | Monden | 123/492 |
| 5,353,764 A | * | 10/1994 | Tomisawa | 123/435 |
| 5,390,640 A | * | 2/1995 | Saito et al. | 123/491 |
| 5,402,763 A | * | 4/1995 | Saito et al. | 123/491 |
| 5,596,968 A | * | 1/1997 | Ueda et al. | 123/480 |
| 5,915,368 A | * | 6/1999 | Ishida et al. | 123/675 |
| 6,466,859 B1 | * | 10/2002 | Fujime | 701/106 |

FOREIGN PATENT DOCUMENTS

| | | | | |
|---|---|---|---|---|
| EP | 295650 A2 | * | 12/1988 | 123/492 |
| JP | 3562026 B2 | | 6/2004 | |

* cited by examiner

*Primary Examiner*—Willis R Wolfe, Jr.
(74) *Attorney, Agent, or Firm*—Crowell & Moring LLP

(57) ABSTRACT

The invention precisely achieves an air fuel ratio control precision in each of operating regions of an engine, particularly a demand air fuel ratio at a time of an engine transition. In a fuel control system correcting a basic fuel amount in such a manner as to estimate a fuel adhered to an air intake pipe of an engine and an evaporated fuel from the adhered fuel so as to achieve a demanded air fuel ratio, a temperature of a fuel adhered portion is estimated on the basis of an amount relation between the fuel to be adhered and the already adhered fuel, or a heat quantity balance. A fuel adhesion amount and a fuel evaporation amount are determined on the basis of the estimated temperature.

9 Claims, 22 Drawing Sheets

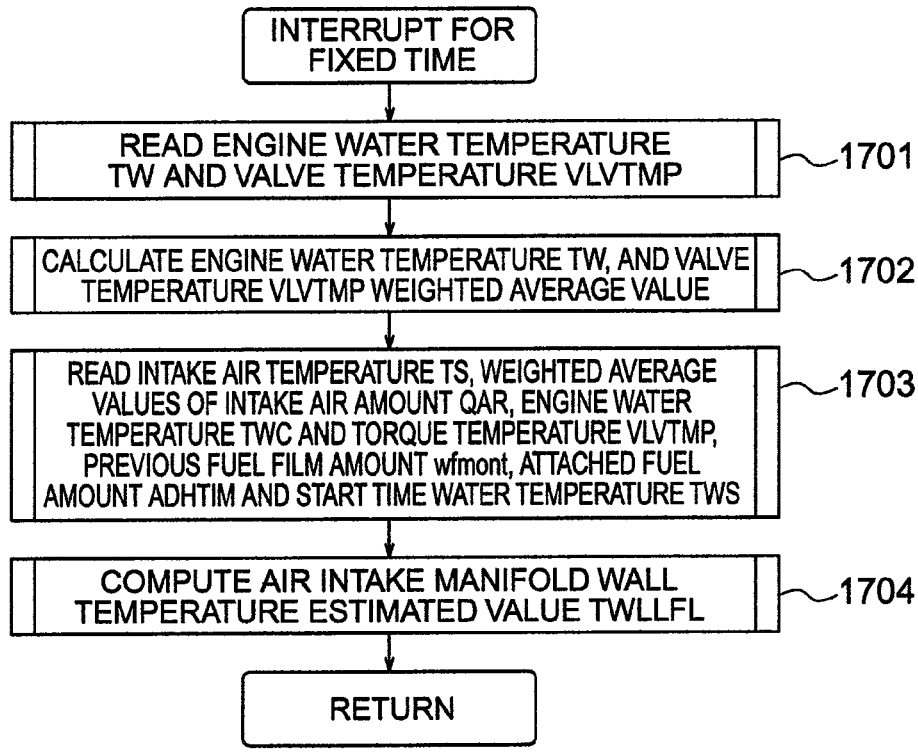
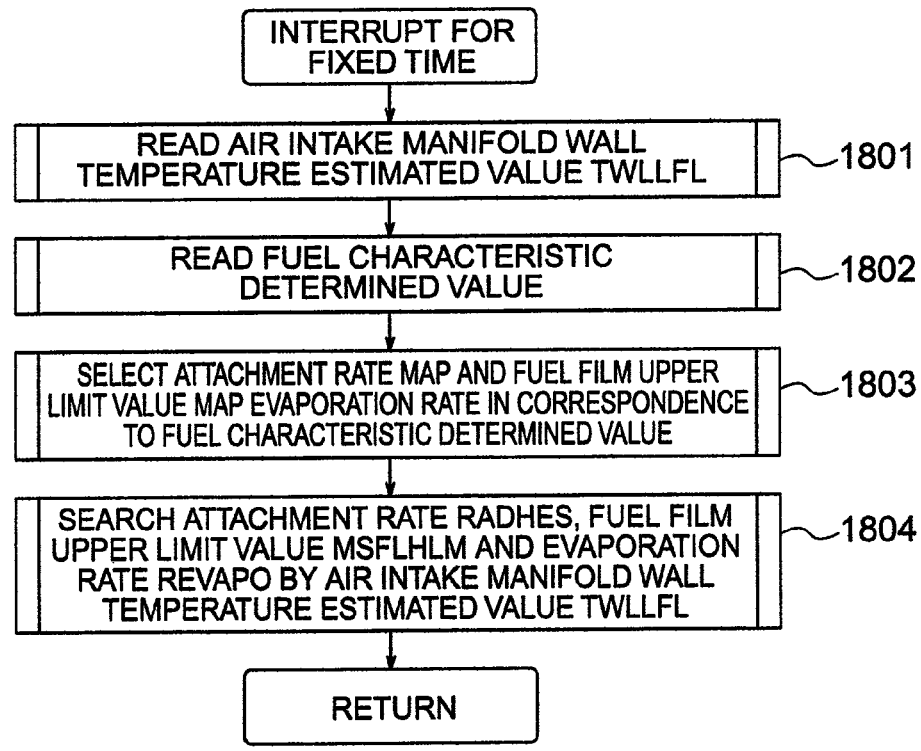

FUEL CONTROL SYSTEM OF INTERNAL COMBUSTION ENGINE

BACKGROUND OF THE INVENTION (1) Field of the Invention

The present invention relates to a fuel control system of an internal combustion engine, and more particularly to a fuel control system of an internal combustion engine which can precisely achieve an air-fuel ratio control precision in each of operating ranges of the internal combustion engine, in detail, a demanded air fuel ratio at a time of an engine transition period.

(2) Description of Related Art

As a fuel control apparatus of an internal combustion engine, there is a structure which stores a balanced adhering amount of a fuel film with respect to a cooling water temperature of an internal combustion engine (an engine), determines a base fuel film correction amount with respect to a base fuel, further prepares an air intake valve predictive temperature, determines an engine temperature unbalanced state such as a warming up or the like in the case that a difference exists between the cooling water temperature and the air intake valve predictive temperature, calculates a fuel film correction amount of the temperature unbalanced state in correspondence to the temperature difference, and adds to the base fuel film correction amount so as to correct (for example, patent document 1 (JP-B2-3562026)).

The conventional method mentioned above takes into consideration the temperature transition period of the engine such as the warming up or the like, however, does not take into consideration a macroscopic temperature change in a place to which the fuel film is actually adhered. For example, in the conventional method, there is no difference between a cooling water temperature and an air intake valve predictive temperature after the warming up, and the temperature balanced state is determined. Thereafter, the fuel is only corrected on the basis of the change of the balanced fuel film amount in accordance with the region. In other words, the same amount of correction is always applied in the repeat of the transition under the same condition.

However, the temperature at the position to which the fuel film is adhered is changed before and after the transition, on the basis of a heat quantity of the fuel, a heat transmission from the air intake valve, and a heat quantity absorbed by the intake air amount, the adhesion of the fuel, and an evaporation from the fuel film are differentiated in accordance with the change of the temperature, and the fuel film amount is also changed. In the repeat of the transition under the same condition, in order to achieve the demanded air fuel ratio, it is necessary to carry out the correction in correspondence to the fuel film amount change in accordance with the heat quantity change.

BRIEF SUMMARY OF THE INVENTION

The present invention is made by taking the problem to be solved into consideration, and an object of the present invention is to provide a fuel control system which can achieve an air fuel ratio control precision in each of operating regions of an engine, particularly precisely achieve a demand air fuel ratio at a time of an engine transition.

In order to achieve the object mentioned above, in accordance with the present invention, there is provided a fuel control system of an internal combustion engine, comprising:

a fuel adhesion rate computing means computing a fuel adhesion rate at which an injection fuel is adhered to an air intake pipe on the basis of a representative temperature at a position at which the injection fuel is adhered;

a fuel evaporation rate computing means computing a fuel evaporation rate of the air intake pipe adhered fuel on the basis of the representative temperature of the position at which the injection fuel is adhered;

a fuel adhesion amount computing means computing a fuel adhesion amount on the basis of the fuel injection amount and the fuel adhesion rate computed by the fuel adhesion rate computing means;

a fuel film amount computing means computing a fuel film amount of the air intake pipe on the basis of the fuel adhesion amount computed by the fuel adhesion amount computing means and the fuel evaporation rate computed by the fuel evaporation rate computing means;

a means for computing an applied heat quantity applied to the fuel adhered to the air intake pipe;

a means for computing an absorbed heat quantity absorbed from the fuel adhered to the air intake pipe;

a heat quantity balance computing means computing a balance of the applied heat quantity given to the fuel and the absorbed heat quantity absorbed from the fuel;

a fuel film estimating means estimating the representative temperature of the position to which the injection fuel is adhered, on the basis of the heat quantity balance computed by the heat quantity balance computing means;

a fuel film correction coefficient computing means computing a fuel film correction coefficient on the basis of the fuel film amount computed by the fuel film amount computing means; and a fuel injection amount correcting means correcting the fuel injection amount on the basis of the fuel film correction coefficient computed by the fuel film correction coefficient computing means.

Further, in order to achieve the object mentioned above, in accordance with the present invention, there is provided a fuel control system of an internal combustion engine, comprising:

a fuel adhesion rate computing means computing a fuel adhesion rate at which an injection fuel is adhered to an air intake pipe on the basis of a representative temperature at a position at which the injection fuel is adhered;

a fuel evaporation rate computing means computing a fuel evaporation rate of the air intake pipe adhered fuel on the basis of the representative temperature of the position at which the injection fuel is adhered;

a fuel adhesion amount computing means computing a fuel adhesion amount on the basis of the fuel injection amount and the fuel adhesion rate computed by the fuel adhesion rate computing means;

a fuel film amount computing means computing a fuel film amount of the air intake pipe on the basis of the fuel adhesion amount computed by the fuel adhesion amount computing means and the fuel evaporation rate computed by the fuel evaporation rate computing means;

an engine water temperature detecting means detecting an engine water temperature;

a valve temperature computing means computing a temperature of the air intake valve;

a means for comparing an amount of the fuel adhered to the air intake pipe with an amount of the fuel already adhered to the air intake pipe;

an air intake manifold wall temperature estimating means estimating a representative temperature of the position to which the injection fuel is adhered, on the basis of the engine water temperature, the temperature of the air intake valve and the result of comparison;

a fuel film correction coefficient computing means computing a fuel film correction coefficient on the basis of the fuel film amount computed by the fuel film amount computing means; and a fuel injection amount correcting means correcting the fuel injection amount on the basis of the fuel film correction coefficient computed by the fuel film correction coefficient computing means.

Further, in accordance with the present invention, it is preferable that the balance of the applied heat quantity and the absorbed heat quantity includes a heat quantity near the air intake valve.

Further, in accordance with the present invention, it is preferable that the heat quantity near the valve is computed by a heat quantity transmission rate of the temperature near the valve determined on the basis of the temperature near the valve and the intake air amount of the internal combustion engine from an integrated value of the intake air amount of the internal combustion engine.

Further, in accordance with the present invention, it is preferable that the balance of the applied heat quantity and the absorbed heat quantity includes a heat quantity of the intake air amount of the internal combustion engine.

Further, in accordance with the present invention, it is preferable that the balance of the applied heat quantity and the absorbed heat quantity includes a heat quantity of the fuel.

Further, in accordance with the present invention, it is preferable that the balance of the applied heat quantity and the absorbed heat quantity includes a heat quantity of an engine cooling water.

Further, in accordance with the present invention, it is preferable that the air intake manifold wall temperature estimating means has a means for storing a predetermined temperature width with respect to the result of comparison, a means for deciding a reaching temperature to any one of an engine water temperature near the adhered position and the temperature near the air intake valve on the basis of the result of comparison, and a means for approximating to the decided reaching temperature in increments of the predetermined temperature width.

Further, in accordance with the present invention, it is preferable that the predetermined temperature width with respect to the result of comparison is constituted by a stored parameter group stored in correspondence to a magnitude of the result of comparison.

In accordance with the fuel control system of the internal combustion engine on the basis of the present invention, the structure is made such as to estimate the temperature (the air intake manifold wall temperature) of the position to which the fuel is adhered by the heat quantity balance applied to the already adhered fuel (the air intake manifold wall temperature), and decide the adhesion rate of the fuel and the evaporation rate from the fuel film from the air intake manifold wall temperature.

Further, in accordance with the other aspect, since the structure is made such as to determine the fuel temperature estimated value and the valve temperature estimated value in such a manner that the upper and lower limit values can be set, and change the air intake manifold wall temperature on the basis of the quantitative relation between the fuel adhered within the range and the fuel film amount, an over correction is not carried out by an abnormal temperature, and it is possible to keep a robustness.

It is possible to precisely control on the basis of a target air fuel ratio by estimating the fuel film amount and adding the correction to the fuel injection. Further, it is possible to estimate an accurate air intake manifold wall temperature corresponding to various operation ranges of the internal combustion engine, by taking into consideration the heat quantity of the fuel, the heat quantity of the valve and the heat quantity balance absorbed by the intake air, and it is possible to improve a precision of estimation of the fuel film amount.

Accordingly, it is possible to determine the correction amount corresponding to the air fuel ratio fluctuation generated by the air intake manifold wall temperature reduction at a time when the fuel injection amount is increased, for example, by a rapid acceleration repeat, and it is possible to improve an air fuel ratio control precision.

Other objects, features and advantages of the invention will become apparent from the following description of the embodiments of the invention taken in conjunction with the accompanying drawings.

BRIEF DESCRIPTION OF THE SEVERAL VIEWS OF THE DRAWING

FIG. 17 is a detailed flow chart of an air intake manifold wall temperature estimation by an air intake manifold wall temperature estimating portion in accordance with the present embodiment;

FIG. 18 is a detailed flow chart of a fuel film amount parameter computation by the fuel film amount parameter computing portion in accordance with the present embodiment;

DETAILED DESCRIPTION OF THE INVENTION

A description will be given in detail of an embodiment of a fuel control system in accordance with the present invention with reference to the accompanying drawings.

Figure 1:
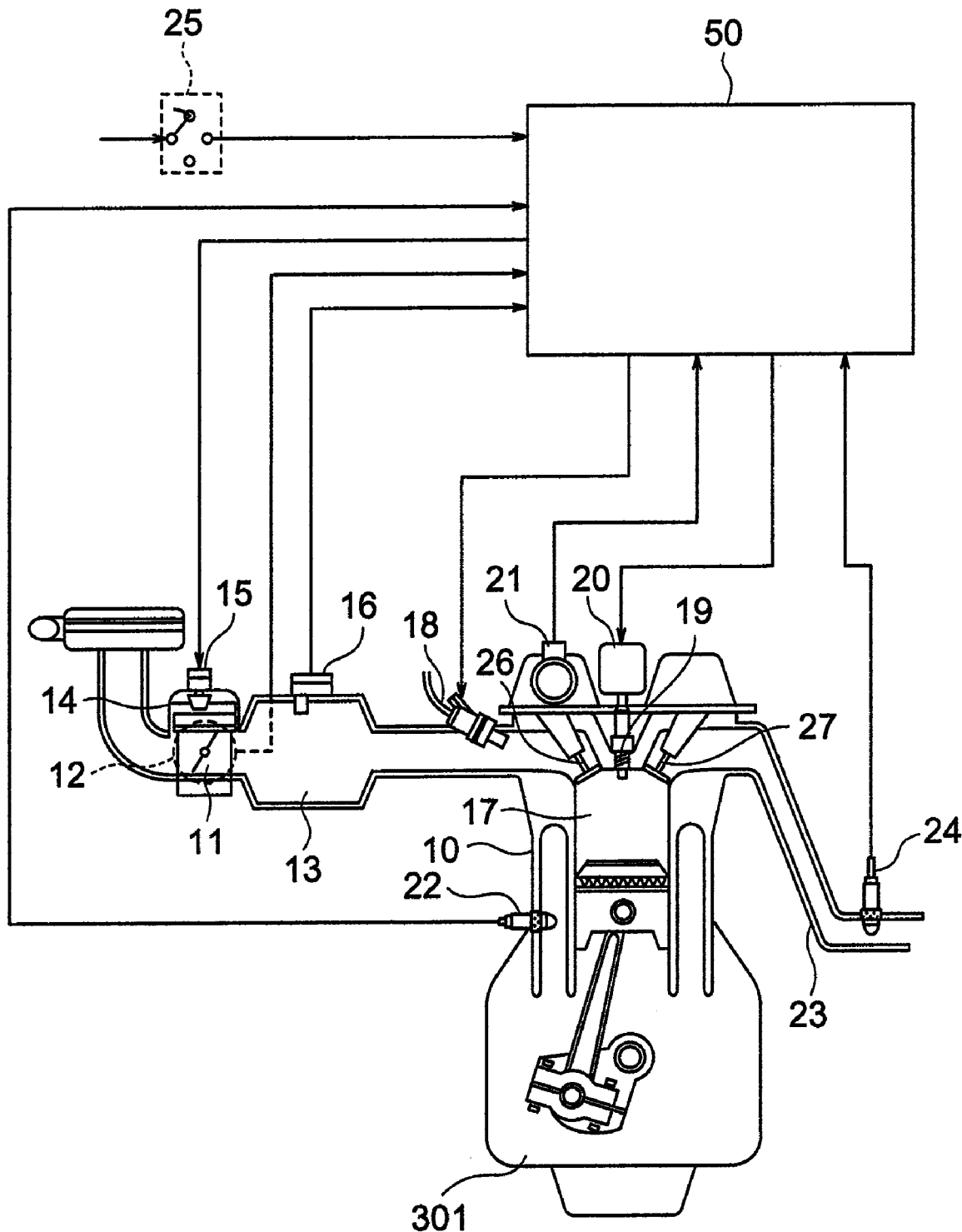
FIG. 1 is a general schematic view showing one embodiment of an internal combustion engine to which a fuel control apparatus in accordance with the present invention is applied.

First, a description will be given of one embodiment of an internal combustion engine (an engine) to which the fuel control system in accordance with the present invention is applied, with reference to FIG. 1.

An engine 10 has a throttle valve 11, a throttle opening degree sensor 12 measuring an opening degree (a throttle opening degree TVO) of the throttle valve 11, an idle speed control valve (an ISC valve) 15 controlling a flow path area of a bypass flow path 14 connected to an air intake pipe 13 while bypassing the throttle valve 11 so as to control an engine speed at an idling time of the engine 10, an air intake pipe pressure sensor 16 detecting a pressure within the air intake pipe 13, and a fuel injection valve 18 injection feeding a fuel demanded by the engine 10 to a combustion chamber 17 in each of cylinders on the basis of a fuel injection signal output by an engine control system 50, in an air intake system. The fuel injection valve 18 is provided in each of the cylinders. The engine 10 has an air intake valve 26 and an exhaust valve 27 in each of the cylinders.

The engine 10 is provided with an ignition plug 19 in each of the cylinders for igniting an air-fuel mixture of an air and a fuel fed to the combustion chamber 17, and an ignition coil (an ignition module) 20 feeding an ignition energy on the basis of an ignition signal output by the engine control system 50.

Further, the engine 10 is provided with a crank angle sensor (a cam angle sensor) 21 detecting a crank angle, and a water temperature sensor 22 detecting a cooling water temperature.

An oxygen concentration sensor 24 measuring an oxygen concentration in an exhaust gas is attached to an exhaust pipe 23 of the engine 10.

The engine 10 is operated and stopped by an ignition switch 25 corresponding to a main switch.

In this case, the air intake pipe pressure sensor 16 is integrated with an intake gas temperature sensor measuring an intake gas temperature.

The oxygen concentration sensor 24 is shown as a sensor outputting a proportional signal to an exhaust gas air fuel ratio, however, may be structured such that the exhaust gas output two signals in a rich side and a lean side with respect to a theoretical air fuel ratio.

A fuel control including an air fuel ratio control of the engine 10, an ignition timing control, an idle control and the like are carried out by the engine control system 50. In the present embodiment, a fuel control is established by detecting an air intake pipe pressure by the air intake pipe pressure sensor 16, however, it goes without saying that the fuel control may be established by detecting the intake air amount of the engine 10.

Figure 2:
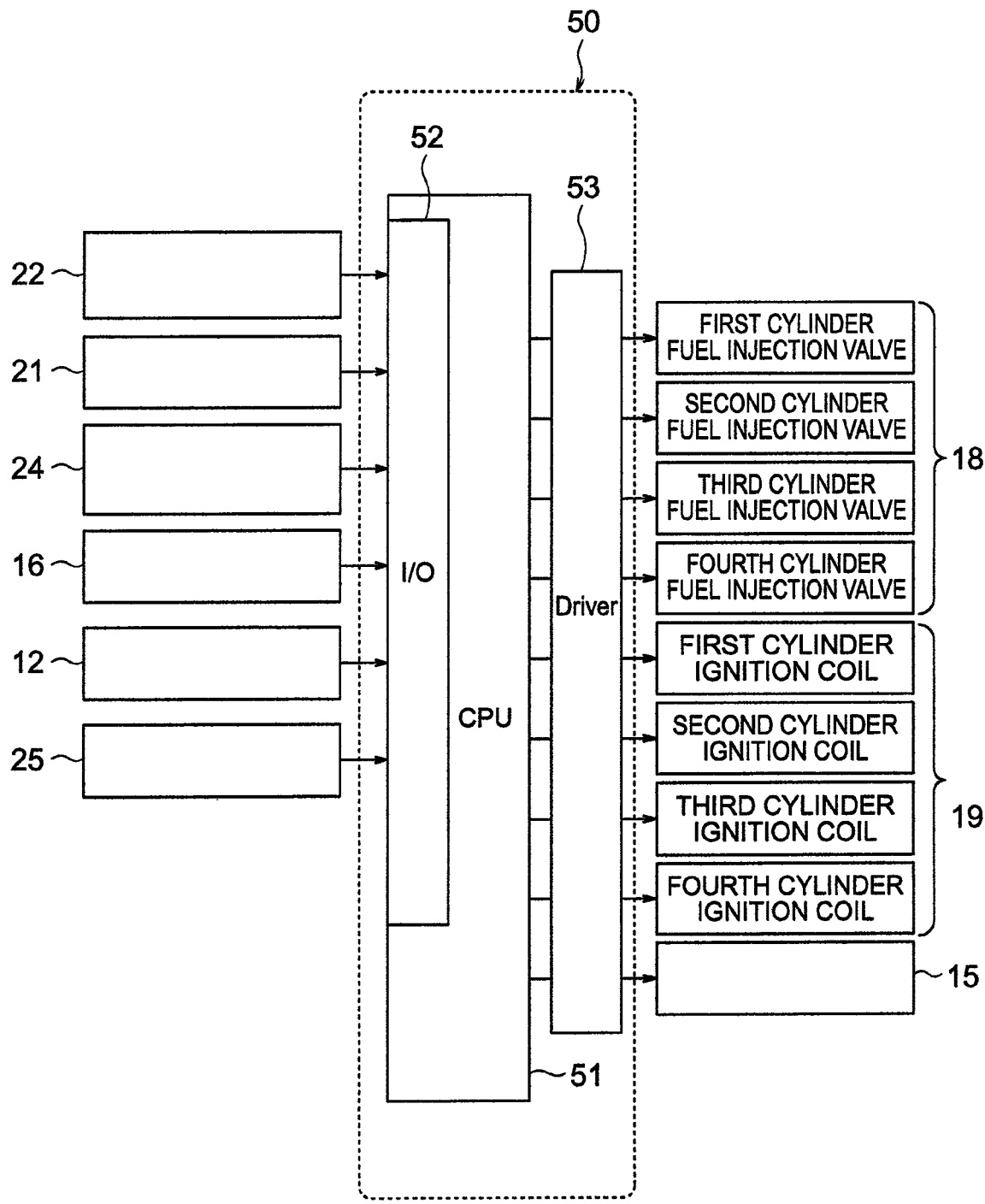
FIG. 2 is a block diagram of an engine control apparatus in accordance with the present embodiment.

The engine control system 50 is of an electronic control type by a microcomputer, as shown in FIG. 2, and has a CPU 51. The CPU 51 is provided with an I/O portion 52 converting an electric signal of each of the sensors installed in the engine 10 into a signal for a digital arithmetic processing, and converting the control signal for the digital arithmetic processing into a drive signal of an actual actuator. The I/O portion 52 inputs an electric signal from each of the water temperature sensor 22, the crank angle sensor 21, the throttle opening degree sensor 12, the oxygen concentration sensor 24 and the ignition switch 25. The CPU 51 outputs an output signal to the fuel injection valve 18 in each of the cylinders, the ignition coil 19 in each of the cylinders, and the ISC valve 15, via an output driver 53.

Figure 3:
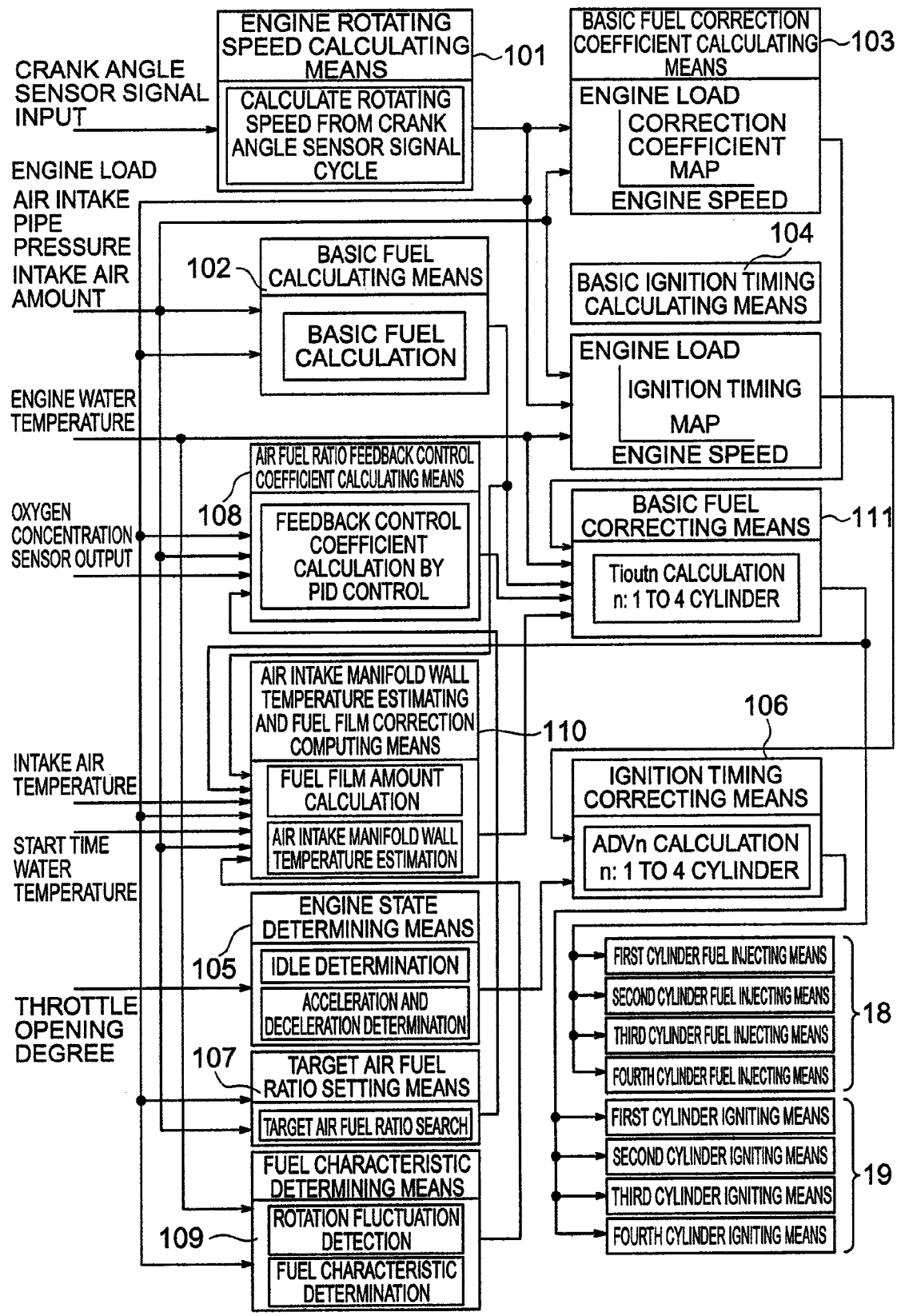
FIG. 3 is a block diagram showing one embodiment of an engine control system serving as a fuel control system provided with an air intake manifold wall temperature estimating apparatus in accordance with the present invention.

Next, a description will be given of one embodiment of the engine control system 50 serving as a fuel control system provided with an air intake manifold wall temperature estimating apparatus in accordance with the present invention, with reference to FIG. 3.

The engine control system 50 embodies in a software manner each of an engine speed calculating means 101, a basic fuel calculating means 102, a basic fuel correction coefficient calculating means 103, a basic ignition timing calculating means 104, an engine state determining means 105, an ignition timing correcting means 106, a target air fuel ratio setting means 107, an air fuel ratio feedback control coefficient calculating means 108, a fuel characteristic determining means 109, an air intake manifold wall temperature estimating and fuel film correction computing means 110, and a basic fuel correcting means 111, by executing a computer program.

The engine rotating speed calculating means 101 calculates a rotating speed (an engine speed Ne) per unit time of the engine 10 by counting an electric signal output by the crank angle sensor 21 set at a predetermined crank angle position of the engine 10, mainly an input number per unit time of a pulse signal change, and arithmetically processing.

The basic fuel calculating means 102 calculates a basic fuel amount demanded by the engine on the basis of the engine speed of the engine 10 computed by the engine speed calculating means 101, and an engine load. The engine load is represented by an air intake pipe pressure obtained by converting an output of the air intake pipe pressure sensor 16 installed in the air intake pipe 13 in accordance with a predetermined process, or an engine intake air amount measured by a thermal type air flow meter or the like.

The basic fuel correction coefficient calculating means 103 calculates a correction coefficient in each of operating ranges of the engine 10 of the basic fuel amount calculated by the basic fuel calculating means 102, on the basis of the engine speed computed by the engine speed calculating means 101 and the engine load mentioned above.

The basic ignition timing calculating means 104 carried out a calculation of an optimum basic ignition timing in each of the operating ranges of the engine 10 in accordance with a map search, on the basis of the engine speed computed by the engine speed calculating means 101 and the engine load mentioned above.

The engine state determining means 105 determines a state of the engine 10 intended by a driver, by detecting the opening degree of the throttle valve 11 set in the air intake pipe 13 and adjusting the intake air amount of the engine 10 by the throttle opening degree sensor 12. The engine state determined by the engine state determining means 105 is mainly whether or not an idle state is established, and whether or not an acceleration or deceleration state is established.

The ignition timing correcting means 106 corrects the optimum basic ignition timing searched by the basic ignition timing calculating means 104 in correspondence to the state of the engine 10 determined by the engine state determining means 105.

The target air fuel ration setting means 107 decides the optimum air fuel ratio in each of the operating ranges of the engine 10 in accordance with the map search or the like, on the basis of the engine speed computed by the engine speed calculating means 101 and the engine load mentioned above.

The air fuel ratio feedback control coefficient calculating means 108 carried out a feedback control of the fuel on the basis of the output of the oxygen concentration sensor 24 set in the exhaust pipe 23 in such a manner that the air fuel ratio of the air-fuel mixture fed to the engine 10 comes to the target air fuel ratio decided by the target air fuel ratio setting means 107, and calculates the air fuel ratio feedback coefficient.

The fuel characteristic determining means 109 determines a nature of the fuel on the basis of a fluctuation of the engine speed computed by the engine speed calculating means 101 and the like. The determination of the fuel characteristic in this case selectively determines a light fuel, a light-heavy intermediate fuel and a heavy fuel.

The air intake manifold wall temperature estimating and fuel film correction computing means 110 estimates a fuel film amount of the fuel adhered to the air intake pipe 13, and an air intake manifold wall temperature of the air intake pipe 13 in the portion to which the fuel is adhered, by using the basic fuel amount calculated by the basic fuel calculating means 102, an effective injection fuel amount obtained by applying the correction to the basic fuel amount by the basic fuel correcting means 111, the temperature of the intake air (the intake air temperature) of the engine 10, the engine speed, a water temperature at a time of starting the engine 10, the engine load, and the fuel characteristic determined value of the fuel characteristic determining means 109, and computes the fuel film correction coefficient on the basis of them.

The basic fuel correcting means 111 applies a correction to the basic fuel calculated by the basic fuel calculating means 102, by the correction coefficient of the basic fuel amount, the engine water temperature, the air fuel ratio feedback coefficient and the fuel film correction coefficient which are mentioned above.

Figure 4:
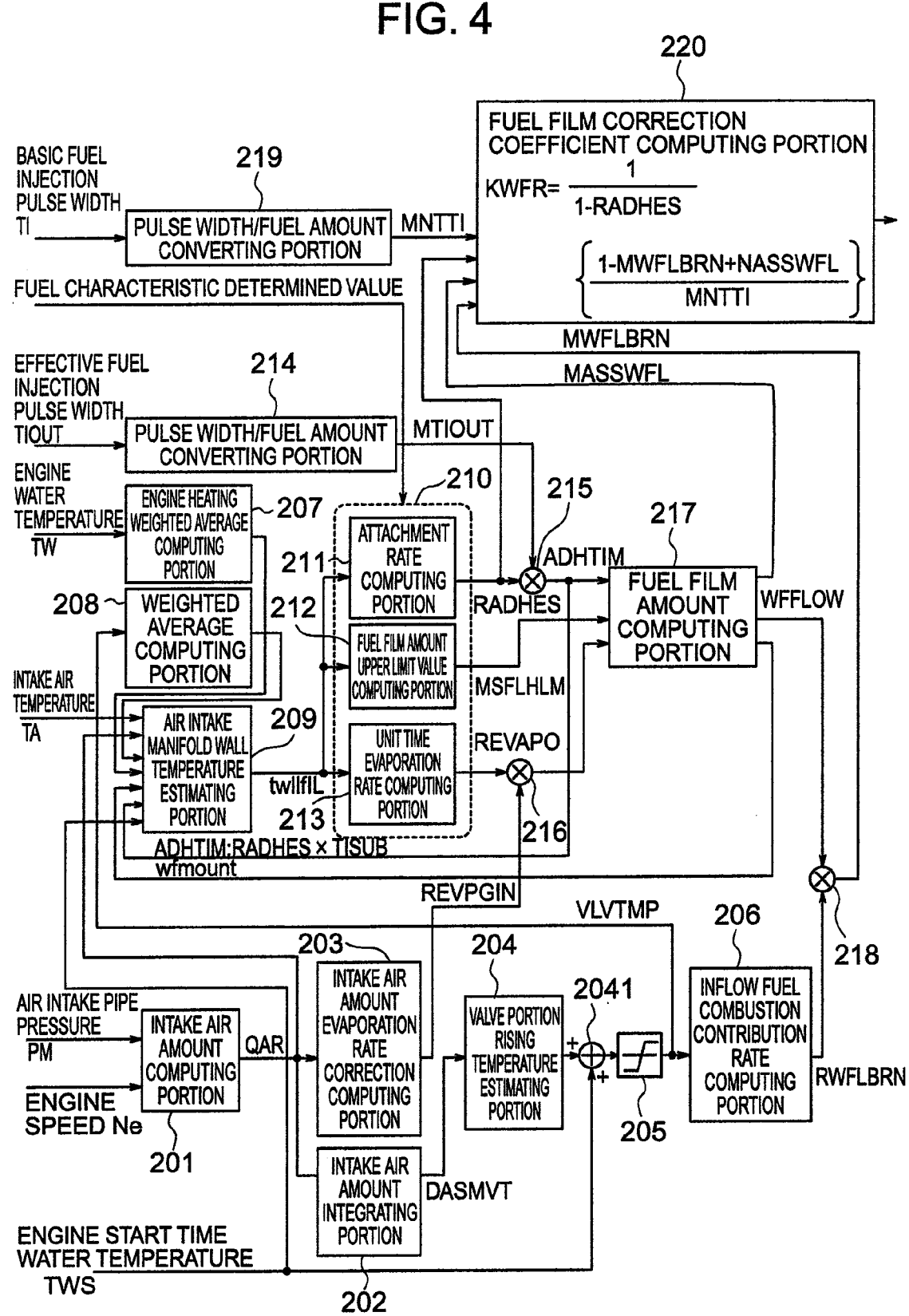
FIG. 4 is a block digraph showing one specific embodiment of an air intake manifold wall temperature estimating and fuel film correction computing means in the fuel control system in accordance with the present invention.

Next, a description will be given of a specific one embodiment of the air intake manifold wall temperature estimating and fuel film correction computing means 110, with reference to FIG. 4.

The air intake manifold wall temperature estimating and fuel film correction computing means 110 has an intake air amount computing portion 201, an intake air amount integrating portion 202, an intake air amount evaporation rate correction computing portion 203, an air intake valve portion rising temperature estimating portion 204, a limiter 205, an inflow fuel combustion contribution rate computing portion 206, an engine water temperature weighted average computing portion 207, a valve temperature weighted average computing portion 208, an air intake manifold wall temperature estimating portion 209, a fuel film amount parameter computing portion 210, a pulse width fuel amount converting portion 214, multipliers 215 and 216, a fuel film amount computing portion 217, a multiplier 218, a pulse width/fuel amount converting portion 219, and a fuel film correction coefficient computing portion 220.

The intake air amount computing portion 201 calculates an air amount QAR which the engine 10 sucks, on the basis of an air intake pipe pressure PM detected by the air intake pipe pressure sensor 16, and an engine speed Ne computed by the engine speed calculating means 101. In this case, in the present embodiment, the intake air amount QAR is calculated on the basis of the engine speed Ne and the air intake pipe pressure PM, however, in the system measuring the intake air amount by the thermal type air flow meter or the like, the intake air amount computing portion 201 is not necessary.

The intake air amount integrating portion 202 inputs a signal indicating an intake air amount QR from the intake air amount computing portion 201, and calculates an integrated value QASMVT of the intake air amount QAR from the engine start.

The intake air amount evaporation rate correction computing portion 203 computes a correction coefficient REVPGIN of an evaporation rate of the fuel film on the basis of the intake air amount QAR calculated by the intake air amount computing portion 201.

The air intake valve portion rising temperature estimating portion 204 estimates and computes a relative rising temperature NLVTM of the air intake valve portion on the basis of the intake air amount integrated value QASMVT obtained by the intake air amount integrating portion 202.

The rising temperature NLVTM of the air intake valve 26 estimated and computed by the air intake valve portion rising temperature estimating portion 204 is added a start time water temperature TWS by an adder 2041 so as to set a valve temperature VLVTMP. The start time water temperature TWS corresponds to a measured value of a cooling water temperature at the engine start time obtained by the water temperature sensor 22.

The valve temperature VLVTMP is applied an upper limit value restriction by the limiter 205, and a fuel contribution rate RWFLBRN of the inflow fuel is calculated by the inflow fuel combustion contribution rate computing portion 206 by using the value.

The engine water temperature weighted average computing portion 207 applies a weighted average to the engine water temperature (the cooling water temperature) TW detected by the water temperature sensor 22.

The valve temperature weighted average computing portion 208 applies a weighted average to the valve temperature VLVTMP mentioned above.

The air intake manifold wall temperature estimating portion 209 is structured such as to estimate a representative temperature of the position to which the injection fuel is adhered, and estimates and calculates an air intake manifold wall temperature (an air intake manifold wall temperature estimated value) TWLLFL by using the intake air temperature TA of the engine 10, the intake air amount QAR, the weighted average value of the engine water temperature TW, the weighted average value of the valve temperature VLVTMP, a fuel film amount WFMOUNT mentioned below, an adhered fuel amount ADHTIM mentioned below, and the engine start time water temperature TWS.

The fuel film amount parameter computing portion 210 is structured such as to input the fuel characteristic determined value, and the signal indicating the air intake manifold wall temperature WLLFL estimated by the air intake manifold wall temperature estimating portion 209 so as to decide a parameter relating to the fuel film amount, and computes a fuel adhesion rate RADHES at which the injection fuel is adhered to the fuel film by a fuel adhesion rate computing portion 211, an upper limit value MSFLHLM of the fuel film amount by a fuel film amount upper limit value computing portion 212, and a fuel evaporation rate REVAPO per unit time from the fuel film by a unit time evaporation rate computing portion 213, on the basis of the fuel characteristic determined value, and the estimated air intake manifold wall temperature WLLFL.

A pulse width/fuel amount converting portion 214 converts an effective fuel injection pulse width TIOU correlating with the actually injected injection fuel amount into an effective injection fuel amount MTIOUT.

A multiplier 215 corresponds to an air intake pipe adhered fuel amount computing means, and calculates an adhered fuel amount ADHTIM to the fuel film by multiplying the effective injection fuel amount MTIOUT converted by the pulse width/fuel amount converting portion 214 by the fuel adhesion rate RADHES computed by the fuel adhesion rate computing portion 211.

A multiplier 216 corrects the intake air amount of the fuel evaporation rate REVAPO by multiplying the fuel evaporation rate REVAPO computed by the unit time evaporation rate computing portion 213 by the evaporation rate correction coefficient REVPGIN computed by the intake air amount evaporation rate correction computing portion 203.

A fuel film amount computing portion 217 computes a fuel film amount WFMOUNT and a fuel film amount evaporation amount MASSWFL by using the adhered fuel amount ADHTIM output by the multiplier 215, the fuel film amount upper limit value REVAPO computed by the fuel film amount upper limit value computing portion 212, and the evaporation rate intake air amount correction amount (REVAPO×REVPGIN) output by the multiplier 216. The fuel film amount computing portion 217 outputs an inflow component WFFLOW to the cylinder (the combustion chamber 17) of the fuel film, and the previous fuel film amount wfmount in addition to the fuel film amount WFMOUNT, and the fuel film evaporation amount MASSWFL.

A multiplier 218 multiplies the fuel contribution rate RWFLBRN computed by the inflow fuel combustion contribution rate computing portion 206, and the inflow component WFFLOW of the fuel film to the cylinder computed by the fuel film amount computing portion 217, and calculates the fuel film inflow combustion contribution rate MWFLBRN.

A pulse width/fuel amount converting portion 219 converts a pulse width TI of the basic fuel output by the basic fuel calculating means 102 into the basic fuel amount MNTTI.

A fuel film correction coefficient computing portion 220 calculates a fuel film correction coefficient KWFR of the injected fuel by using the basic fuel amount MNTTI, the fuel adhesion rate RADHES, the fuel film amount WFMOUNT, and the fuel film inflow combustion contribution component MWFLBRN.

Figure 5:
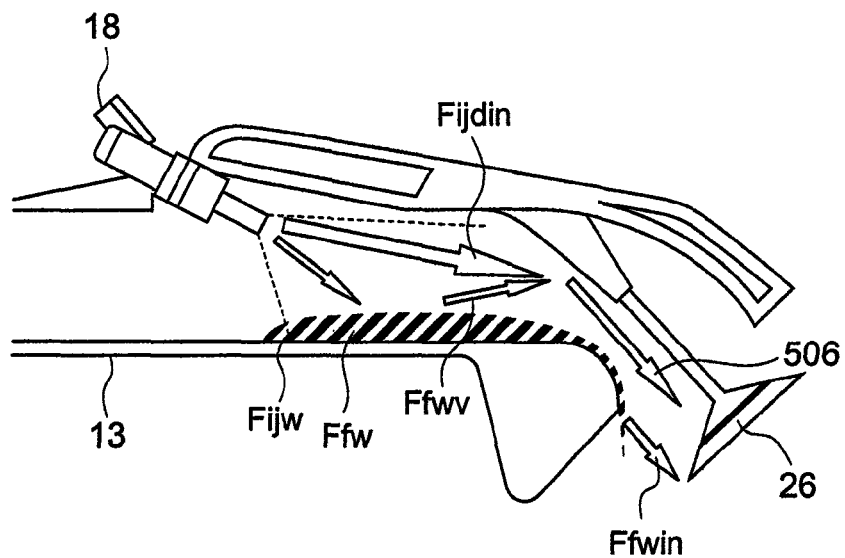
FIG. 5 is an explanatory view showing one example of a behavior of a fuel injected to an air intake passage from a fuel injection valve.

FIG. 5 shows one example of a behavior of the fuel injected to the air intake passage by the fuel injection valve 18. The fuel injected by the fuel injection valve 18 is divided into a fuel Fijw adhered to a fuel film Ffw of the air intake passage and a fuel Fijdin directly flowing into the cylinder. The fuel Fin flowing into the cylinder forms a fuel Fijdin structured such that the fuel injected by the fuel injection valve 18 directly flows into the cylinder, an evaporated fuel Ffwv evaporated from the fuel film Ffw, and a fuel Ffwin (WFFLOW) structured such that the fuel film Ffw flows into the cylinder.

Enciphering the behavior of the fuel mentioned above, the following expressions can be obtained.

$$(1/d)WFMOUNT = MTIOUT \times RADHES - VFMOUNT \times REVAPO \tag{1}$$

$$VFMOUNT = (1 - \Delta t \times REVAPO)wfmount + \Delta t \times MTIOUT \times RADHES - WFFLOW \tag{2}$$

$$LWFMOUNT = \min(WFMOUNT, MSFLHLM) \tag{3}$$

$$WFFLOW = WFMOUNT - LWFMOUNT \tag{4}$$

$$WFFLOW \geq 0 \tag{5}$$

In this case,
WFMOUNT: fuel film amount
LWFMOUNT: true fuel film amount
wfmount: previous fuel film amount
MTIOUT: effective injection fuel amount
RADHES: fuel adhesion rate
REVAPO: fuel evaporation rate
WFFLOW: fuel film inflow component
MSFLHLM: fuel film amount upper limit value
$\Delta t$: calculation cycle The expression (1) expresses an increase and decrease of the fuel film between a small section, and expresses that a value obtained by subtracting the fuel film evaporation component (WFMOUNT×REVAPO) from the injection fuel adhesion component (MTIOUT×RADHES) comes to an inclination of the increase and decrease of the fuel film. In this case, the fuel evaporation rate REVAPO here is applied the correction of the fuel film evaporation rate corresponding to the intake air amount mentioned above.

The expression (2) is obtained by converting the expression (1) into a difference expression, and an actual computation is carried out on the basis of the expression (2). In the expression (2), an approximation WFMOUNT≈wfmount is employed in a part thereof. The expression (3) corresponds to an upper limit value restriction of the fuel film amount WFMOUNT mentioned above, and the fuel film amount WFMOUNT is restricted by the upper limit of the fuel film amount upper limit value MSFLHLM. The expression (4) expresses a computation of the fuel film inflow component WFFLOW to the cylinder at a time of being restricted by the upper limit value.

Next, a description will be given of a relational expression for applying the fuel film correction to the basic fuel amount MNTTI.

$$MASSWFL = WFMOUNT - wfmount \tag{6}$$

$$MWFLBRN = WFFLOW \times RWFLBRN \tag{7}$$

$$MTIOUT = \{1/(1-RADHES)\}(MNTTI - MASSWFL - MWFLBRN) \tag{8}$$

$$KWFR=\{1/(1-RADHES)\}\{(MWFLBRN+MASSWFL)/MNTTI\} \quad (9)$$

$$MTIOUT=KWFR \times MNTTI \quad (10)$$

In this case,

MASSWFL: fuel flow evaporation amount

MWFLBRN: fuel flow inflow combustion contribution component

RWFLBRN: fuel flow inflow fuel combustion contribution component

MTIOUT: effective injection fuel amount

MNTTI: basic fuel amount

KWFR: fuel film correction coefficient

The expression (6) corresponds to a calculation of the fuel film evaporation amount MASSWFL, and is executed per fuel injection timing. The expression (6) is determined by subtracting the fuel film amount wfmount just after the previous fuel injection from the current fuel film amount WFMOUNT.

The expression (7) corresponds to a calculation of the fuel film inflow fuel contribution component MWFLBRN, and is determined by multiplying the fuel film inflow component WFFLOW by the fuel film inflow fuel combustion contribution rate RWFLBRN.

A relation between the fuel film correction basic fuel amount MNTTI and the effective injection fuel amount MTIOUT is expressed by the expression (8), and can be expressed as the fuel film correction value coefficient KWFR by modifying from the expression (8) to the expression (9).

A relation between the basic fuel amount MNTTI and the effective injection fuel amount MTIOUT comes to the expression (10). The effective injection fuel amount MTIOUT may be determined directly from the expression (8) without determining the fuel film correction coefficient KWFR.

Figure 6:
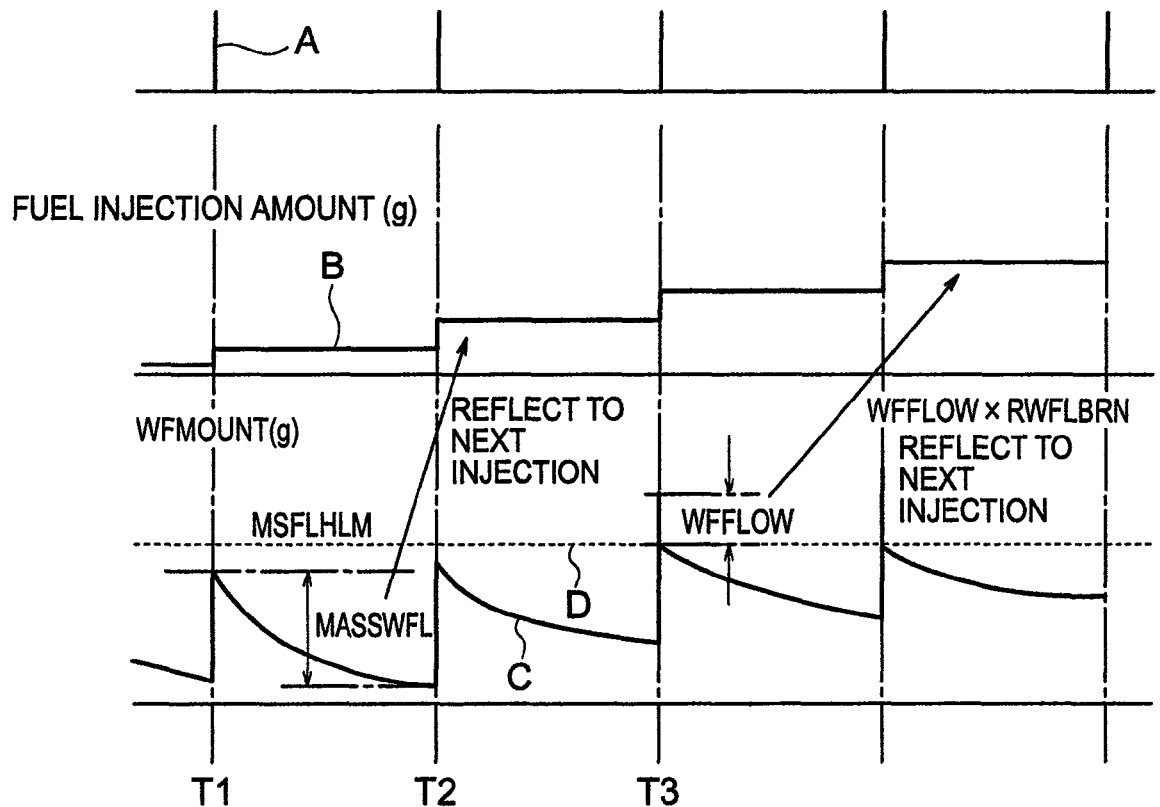
FIG. 6 is a time chart showing a relation among a fuel injection timing, a fuel injection amount and a fuel film amount.

FIG. 6 is one example obtained by expressing the relations (1) to (10) by a time chart.

Reference symbol A denotes a fuel injection timing, and a fuel injection amount B is going to be changed as shown by the drawing in correspondence to the timing. Reference symbol C denotes a behavior of the fuel film, and a difference of the fuel film (the fuel film evaporation amount) MASSWFL between a time point T1 and a time point T2 is reflected to the next injection amount.

A line D corresponds to a fuel film amount upper limit value MSFLHLM, and in the fuel film inflow component FFLOW getting over the fuel film amount upper limit value MSFLHLM in the fuel film at a time point T3, an amount obtained by multiplying the fuel film inflow component WFFLOW by the fuel film inflow fuel combustion contribution rate RWFLBRN is reflected to the next injection amount.

Figure 7:
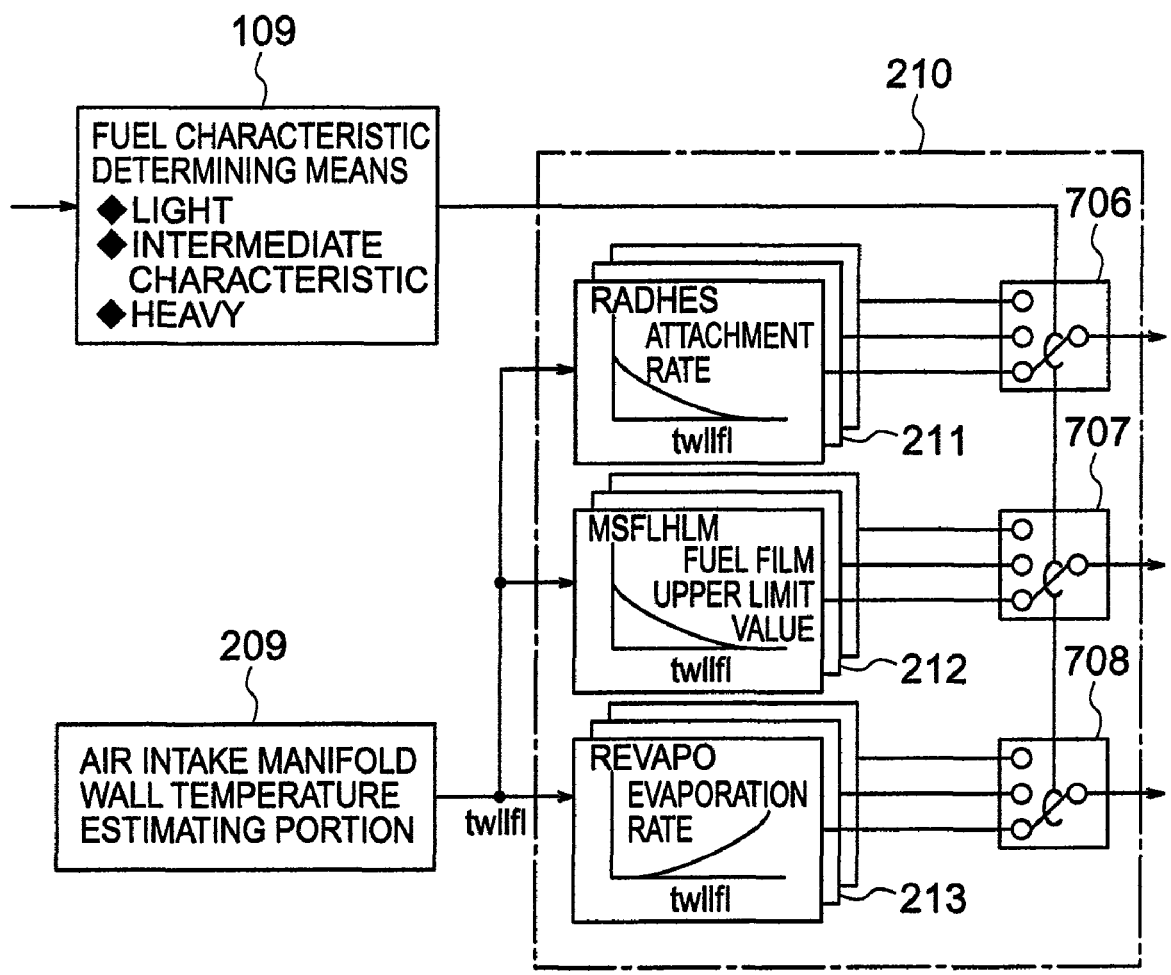
FIG. 7 is a block diagram showing a detailed embodiment of a fuel film amount parameter computing portion in the fuel control system in accordance with the present invention.

FIG. 7 shows one example of a detailed embodiment of the fuel film amount parameter computing portion 210.

The air intake manifold wall temperature (the air intake manifold wall temperature estimated value) TWLLFL estimated by the air intake manifold wall temperature estimating portion 209 is input to the fuel adhesion rate computing portion 211, the fuel film amount upper limit value computing portion 212 and the unit time evaporation rate computing portion 213 so as to respectively search by table the fuel adhesion rate RADHES, the fuel film amount upper limit value MSFLHLM and the fuel evaporation rate REVAPO. The fuel adhesion rate computing portion 211, the fuel film amount upper limit value computing portion 212 and the unit time evaporation rate computing portion 213 are respectively set a plurality of tables, and are switched by switches 706, 707 and 708 in correspondence to the determined value (light/light-heavy intermediate characteristic/heavy) of the fuel characteristic determining means 109 so as to be output.

Figure 8:
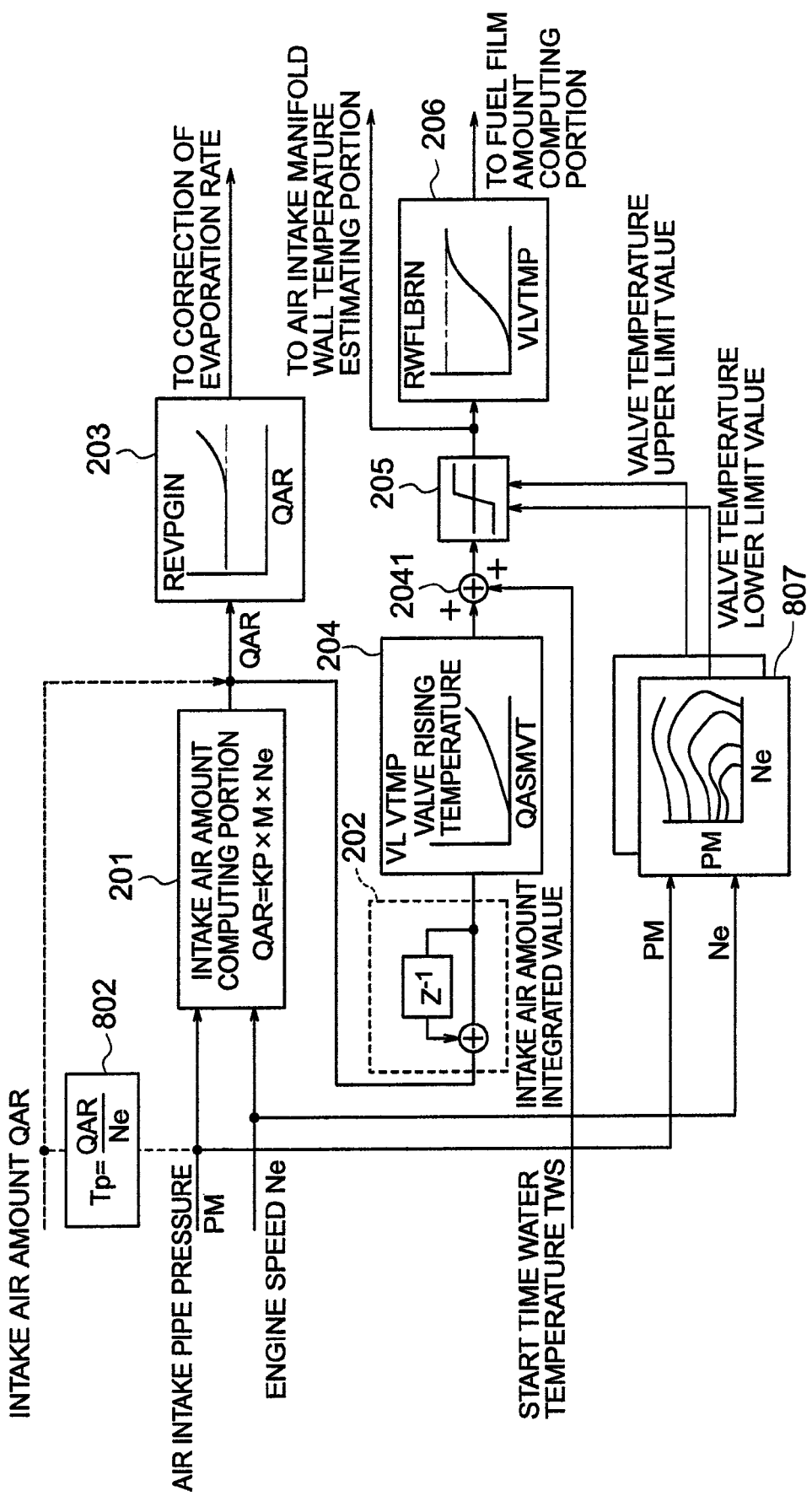
FIG. 8 is a block diagram showing a detailed example of an intake air amount computing portion to an inflow fuel combustion contribution rate computing portion in accordance with the present embodiment.

FIG. 8 shows a detailed example of the intake air amount computing portion 201 to the inflow fuel combustion contribution rate computing portion 206.

The intake air amount computing portion 201 computes the intake air amount QAR by multiplying the air intake pipe pressure PM, the engine speed Ne and the constant K.

In this case, in the system weighting the intake air amount of the engine 10 by the thermal type air flow meter or the like, the intake air amount computing portion 201 is not necessary, and the intake air amount is directly used. In this case, the air intake pipe pressure used in the other computing portions employs an engine load Tp obtained by dividing the intake air amount QAR computed by the engine load computing portion 802 by the engine speed Ne.

The intake air amount evaporation rate correction computing portion 203 determines a correction coefficient REVPGIN of the evaporation rate of the fuel film in accordance with the table search on the basis of the intake air amount QAR.

The intake air amount integrating portion 202 executes an integration of the intake air amount QAR. The air intake valve portion rising temperature estimating portion 204 searches by table a rising temperature VLVTM of the air intake valve 26 on the basis of the integrated value QASMVT of the intake air amount. The rising temperature VLVTM of the air intake valve 26 is added the start time water temperature by the adder 2041 so as to come to the valve temperature VLVTMP, and is applied upper and lower limit values by the limiter 205. The upper and lower limit values by the limiter 205 is searched by map in the air intake pipe pressure (the engine load) PM and the engine speed Ne by a limit value computing portion 807. The valve temperature VLVTMP applied the upper and lower limit values is output to the air intake manifold wall temperature estimating portion 209, and input to the inflow fuel combustion contribution rate computing portion 206, and the inflow fuel combustion contribution rate computing portion 206 searches by table the combustion contribution rate RWFLBRN of the inflow fuel. The combustion contribution rate RWFLBRN of the inflow fuel is output to the fuel film amount computing portion 217.

Figure 9:
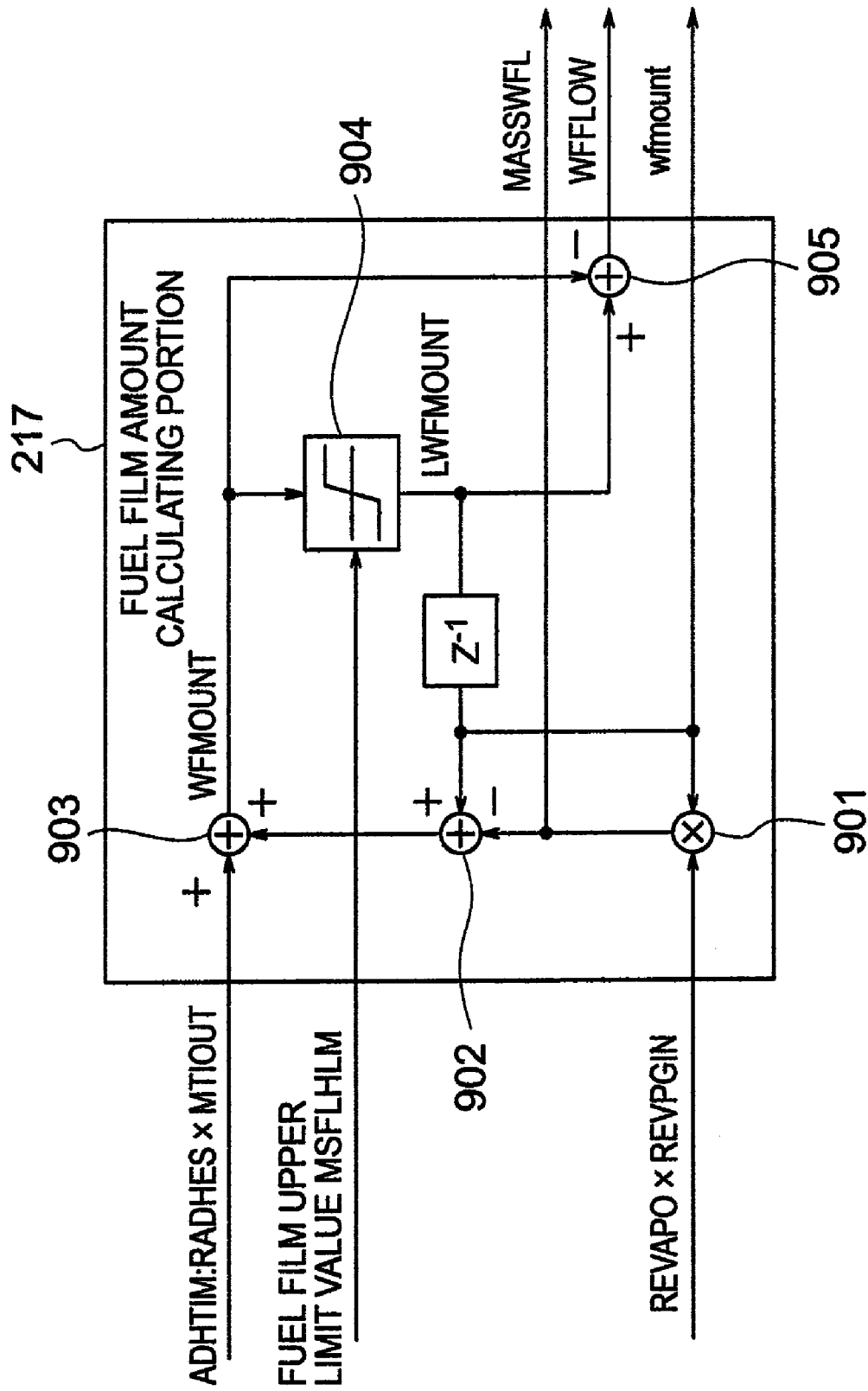
FIG. 9 is a block digraph showing a detailed example of a fuel film amount computing portion in accordance with the present embodiment.

FIG. 9 shows a detailed example of the fuel film amount computing portion 217.

The fuel film amount computing portion 217 has a multiplier 901, adders 902 and 903, a true fuel film amount computing portion 904 and an adder 905.

The multiplier 901 computes a fuel film evaporation amount MASSWFL by multiplying a fuel evaporation rate (REVAPO×REVPGIN) applied the correction of the intake air amount by the previous fuel film amount (the previous value of the true fuel film amount LWFMONT) wfmount.

The adder 903 adds an adhered fuel amount ADHTIM to an amount (wfmount−MASSWFL) obtained by subtracting the fuel film evaporation amount MASSWFL from the previous fuel film amount wfmount by the adder 902 so as to temporarily set the current fuel film amount WFMOUNT.

The true fuel film amount computing portion 904 applies the restriction of the upper limit value by the fuel film amount upper limit value MSFLHLM to the fuel film amount WFMOUNT so as to set the true fuel film amount LWFMONT.

The adder 905 calculates a difference between the temporary fuel film amount WFMOUNT and the true fuel film amount LWFMONT, and calculates the fuel film inflow component WFFLOWE.

Figure 10:
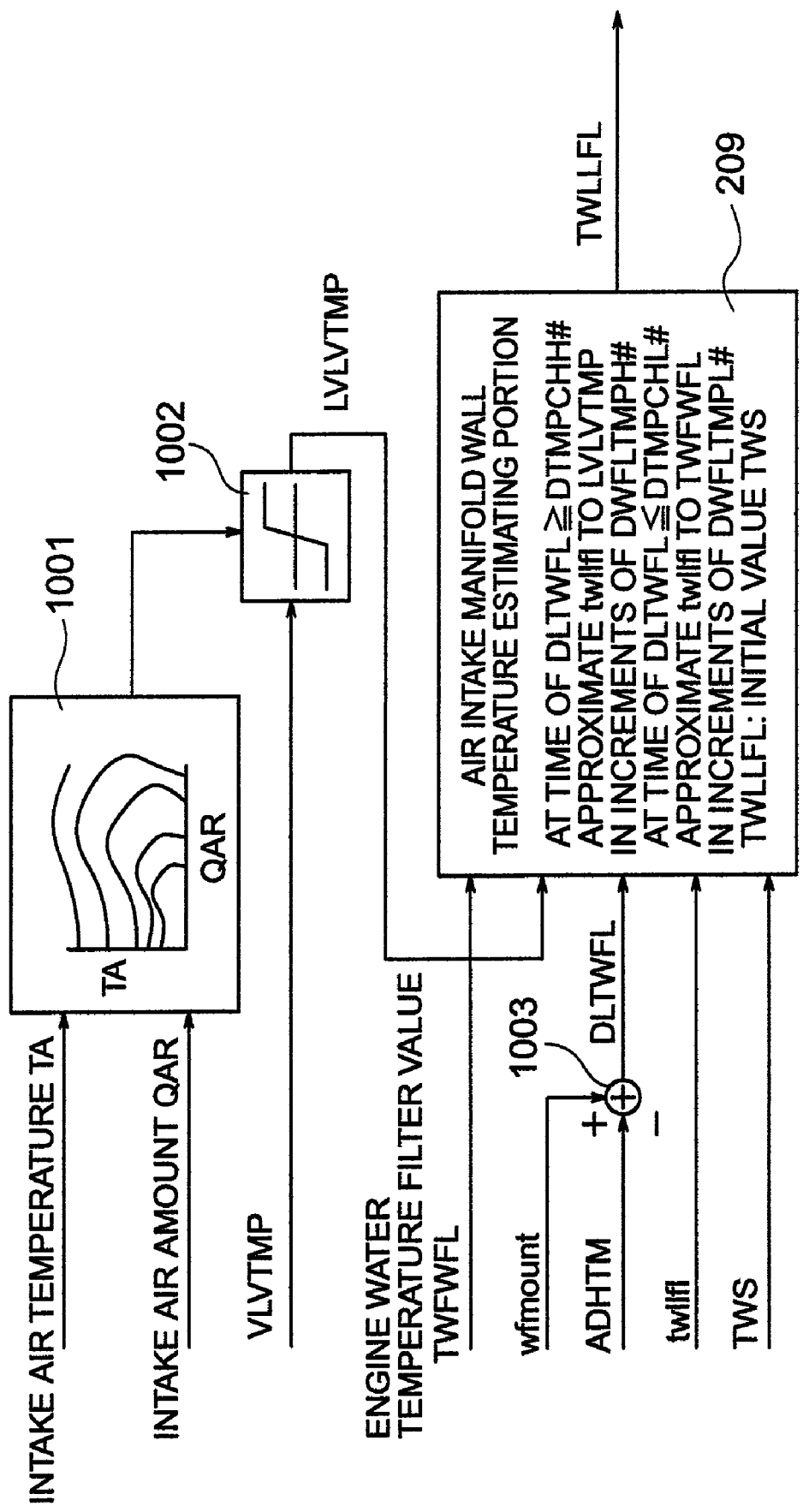
FIG. 10 is a block diagram showing a detailed example of an air intake manifold wall temperature estimating means in accordance with the present embodiment.

FIG. 10 shows details of one embodiment of the air intake manifold wall temperature estimating means.

This embodiment is provided with the air intake manifold wall temperature estimating portion 209, a valve temperature upper limit value computing portion 1001, a limiter 1002, and an adder 1003.

The valve temperature upper limit value computing portion 1001 searches by map the upper limit value of the valve temperature by the intake air temperature TA and the intake air amount QAR. The limiter 1002 applies an upper limit value restriction searched by map by the valve temperature upper limit value computing portion 1001 to the valve temperature VLVTMP. The valve temperature LVLVTMP applied the upper limit value restriction is input to the air intake manifold wall temperature estimating portion 209.

The adder 1003 calculates a difference DLTWFL between the previous fuel film amount wfmount and the adhered fuel amount ADHTIM. The calculation of the difference DLTWFL is obtained by subtracting the adhered fuel amount ADHTIM from the previous fuel film amount wfmount.

The air intake manifold wall temperature estimating portion 209 calculates the air intake manifold wall temperature TWLLFL on the basis of the filter value TWFWFL of the engine water temperature, the valve temperature LVLVTMP applied the upper limit value restriction, the difference DLTWFL between the fuel film amount and the fuel adhesion amount, the previous air intake manifold wall temperature twllfl and the start time water temperature TWS.

The air intake manifold wall temperature estimating portion 209 calculates the air intake manifold wall temperature TWLLFL in accordance with the following rule so as to output.

(1) In the case that the calculation of the air intake manifold wall temperature TWLLFL is the first time, the air intake manifold wall temperature TWLLFL is set to the start time water temperature TWS.

(2) In the case that the difference DLTWFL between the previous fuel film amount wfmount and the adhered fuel amount ADHTIM is larger than a first predetermined value DTMPCHH, the previous air intake manifold wall temperature twllfl is approximated to the valve temperature LVLVTMP applied the upper limit value restriction in increments of a predetermined value (a first predetermined temperature step component) DWFLTMPH.

(3) In the case that the difference DLTWFL between the previous fuel film amount wfmount and the adhered fuel amount ADHTIM is equal to or less than a second predetermined value DTMPCHL, the previous air intake manifold wall temperature twllfl is approximated to the engine water temperature filter value TWFWFL in increments of a predetermined value (a second predetermined temperature step component) DWFLTMPL.

Figure 11:
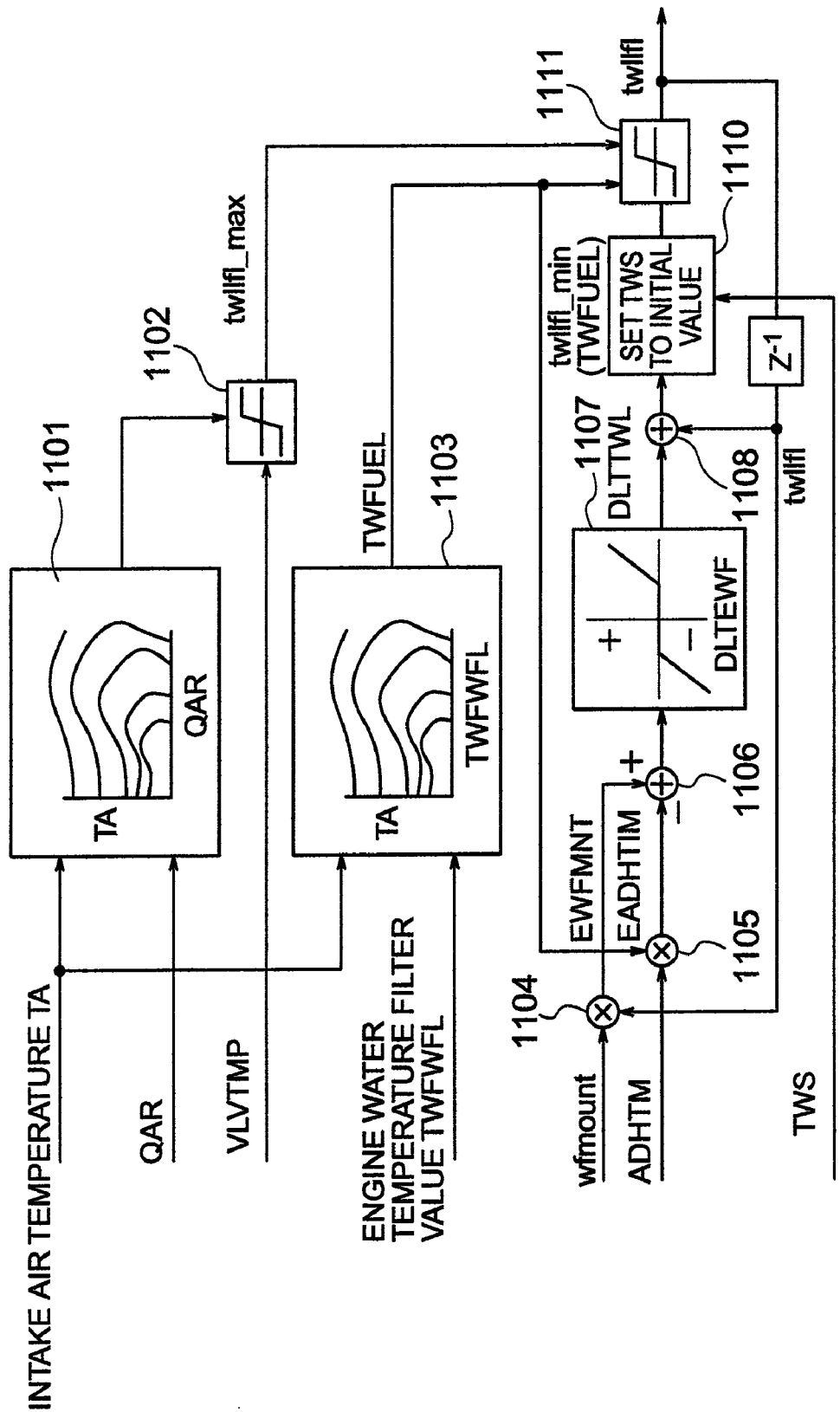
FIG. 11 is a block diagram showing detailed of the other embodiment of the air intake manifold wall temperature estimating means.

FIG. 11 shows details of the other embodiment of the air intake manifold wall temperature estimating means.

This embodiment has a valve temperature upper limit value computing portion 1101, a limiter 1102, a fuel temperature computing portion 1103, multipliers 1104 and 1105, an adder 1106, an air intake manifold wall temperature change amount computing portion 1107, an adder 1108, an initial value setting device 1110 and a limiter 1111.

The valve temperature upper limit value computing portion 1101 searches by map an upper limit value of the valve temperature VLVTMP on the basis of the intake air temperature TA and the intake air amount QAR. The limiter 1102 applies an upper limit value restriction TWLLFLmax searched by map by the valve temperature upper limit value computing portion 1001 to the valve temperature VLVTMP.

The fuel temperature computing portion 1103 searches by map the fuel temperature TWFUEL on the basis of the intake air temperature TA and the engine water temperature filter value TWFWFL.

The multiplier 1104 multiplies the previous fuel film amount wfmount and the previous air intake manifold wall temperature twllfl so as to calculate the fuel film heat quantity EWFMNT.

The multiplier 1105 multiplies the fuel adhered amount ADHTIM and the fuel temperature TWFUEL so as to calculate the adhered fuel heat quantity EADHTIM.

The adder 1106 calculates a difference (a heat quantity balance) DLTEWF between the fuel film heat quantity EWFMNT and the adhered fuel heat quantity EADHTIM, and the air intake manifold wall temperature change amount computing portion 1107 searches by table the air intake manifold wall temperature change amount DLTTWL in correspondence to the difference DLTEWF.

The adder 1108 adds the air intake manifold wall temperature change amount DLTTWL and the previous air intake manifold wall temperature twllfl so as to calculate the air intake manifold wall temperature TWLLFL. In the case that the calculation of the air intake manifold wall temperature TWLLFL is the first time, the start time water temperature TWS of the engine 10 is set to the air intake manifold wall temperature TWLLFL by the initial value setting device 1110. The other calculated air intake manifold wall temperature TWLLFL is applied the restriction of the upper and lower limit values by the valve temperature TWLLFLmax applied the upper limit value and the valve temperature lower limit value TWLLFLmin corresponding to the fuel temperature TWFUEL, by the limiter 1111 so as to be output.

Figure 12:
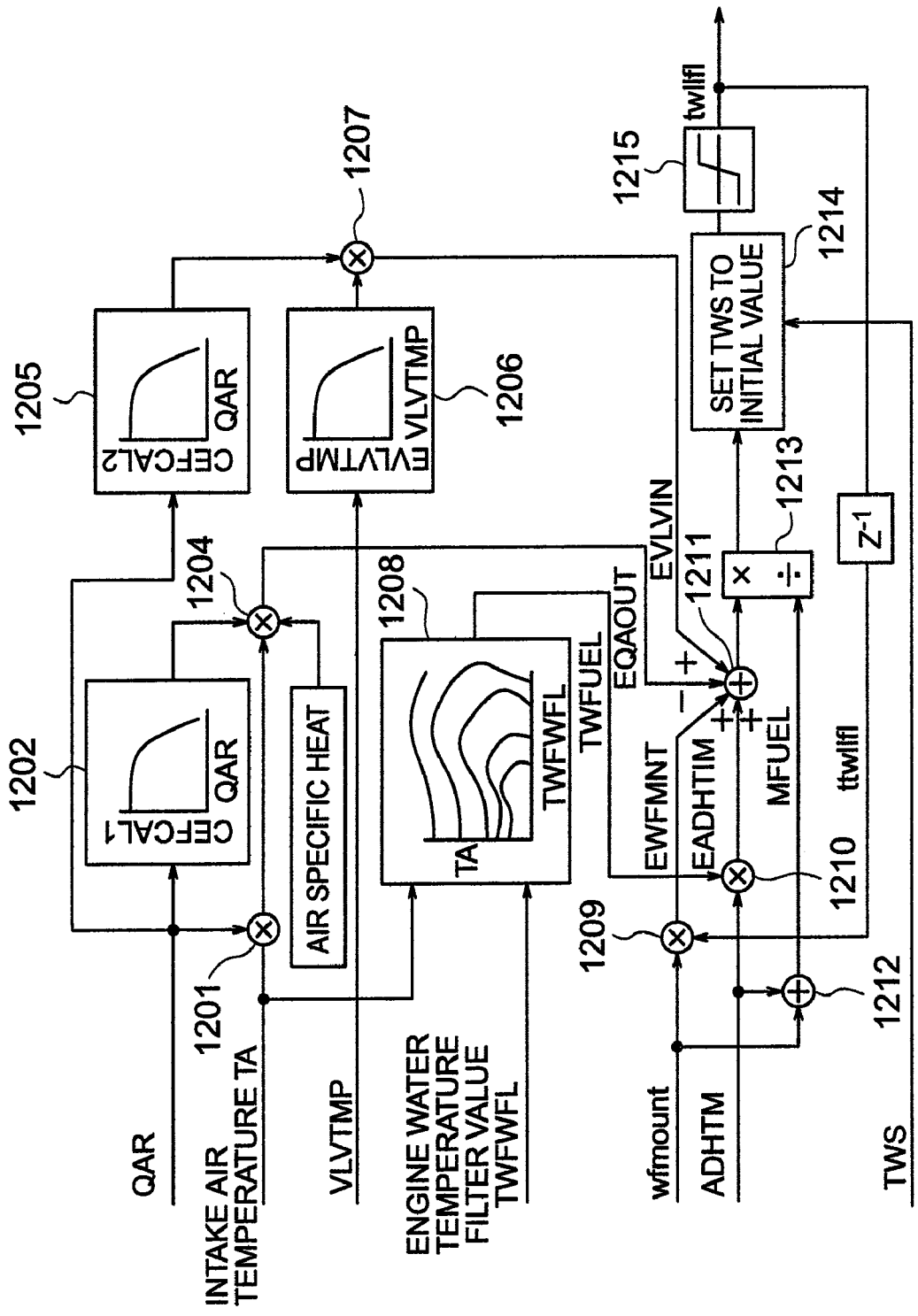
FIG. 12 is a block diagram showing details of further the other embodiment of the air intake manifold wall temperature estimating means.

FIG. 12 shows details of further the other embodiment of the air intake manifold wall temperature estimating means.

In this embodiment, an intake air absorbing heat quantity (an absorbed heat quantity) EQAOUT absorbed from the fuel film is calculated by multiplying the intake air amount QAR and the intake air temperature TA by a multiplier 1201, and thereafter multiplying a specific heat of the air and a coefficient (an intake air heat quantity transmission rate) CEFCAL1 participating in the specific heat of the air and the heat quantity of the fuel film by a multiplier 1204.

The coefficient CEFCAL1 participating in the heat quantity of the fuel film is searched by table from the intake air amount QAR by a coefficient setting device 1202.

Further, a coefficient (a valve heat quantity transmission rate) CEFCAL2 in which the heat quantity EVLVTMP of the air intake valve 26 participates in the heat quantity of the fuel film is searched by table on the basis of the intake air amount QAR by a coefficient setting device 1205. The heat quantity EVLVTMP of the air intake valve 26 is searched by table from the valve temperature VLVTMP by an air intake valve heat quantity computing portion 1206.

A multiplier 1207 multiplies the coefficient CEFCAL2 in which the heat quantity EVLVTMP of the air intake valve 26 participates in the heat quantity of the fuel film, and the heat quantity EVLVTMP of the air intake valve 26, and a heat quantity (an applied heat quantity) EVLVIN applied to the fuel film is calculated.

A fuel temperature computing portion 1208 searches by table the fuel temperature TWFUEL on the basis of the intake air temperature TA and the engine water temperature filter value TWFWEL.

A multiplier 1209 multiplies the previous air intake manifold wall temperature twllfl and the previous fuel film amount wfmount so as to compute the fuel film heat quantity EWFMNT.

A multiplier 1210 multiplies the adhered fuel amount ADHTIM and he fuel temperature TWFUEL so as to compute the heat quantity EADHTIM of the adhered fuel.

An adder 1211 corresponds to a heat quantity balance computing means, adds and subtracts the heat quantity EADHTIM of the adhered fuel, the heat quantity EWFMNT of the fuel film, the intake air amount absorbed heat quantity EQAOUT absorbed from the fuel film, and the heat quantity EVLVIN applied to the fuel film of the valve so as to calculate the heat quantity balance.

An adder 1212 calculates a total addition amount MFUEL of the previous fuel film amount wfmount and the adhered fuel amount ADHTIM.

A divider 1213 divides the heat quantity balance computed by the adder 1211 by the total addition amount MFUEL so as to calculate a new air intake manifold wall temperature TWLLFL. In this case, in the case that the calculation of the air intake manifold wall temperature TWLLFL is the first time, the start time water temperature TWS is set to the first time wall temperature TWLLFL by an initial value setting device 1214. The calculated air intake manifold wall temperature TWLLFL is restricted by the upper and lower limit values by a limiter 1215.

FIGS. 13A to 13E are time charts expressing one example of respective parameter behaviors at a time when the fuel control system corresponding to the subject of the present invention controls the engine 10.

Figure 13:
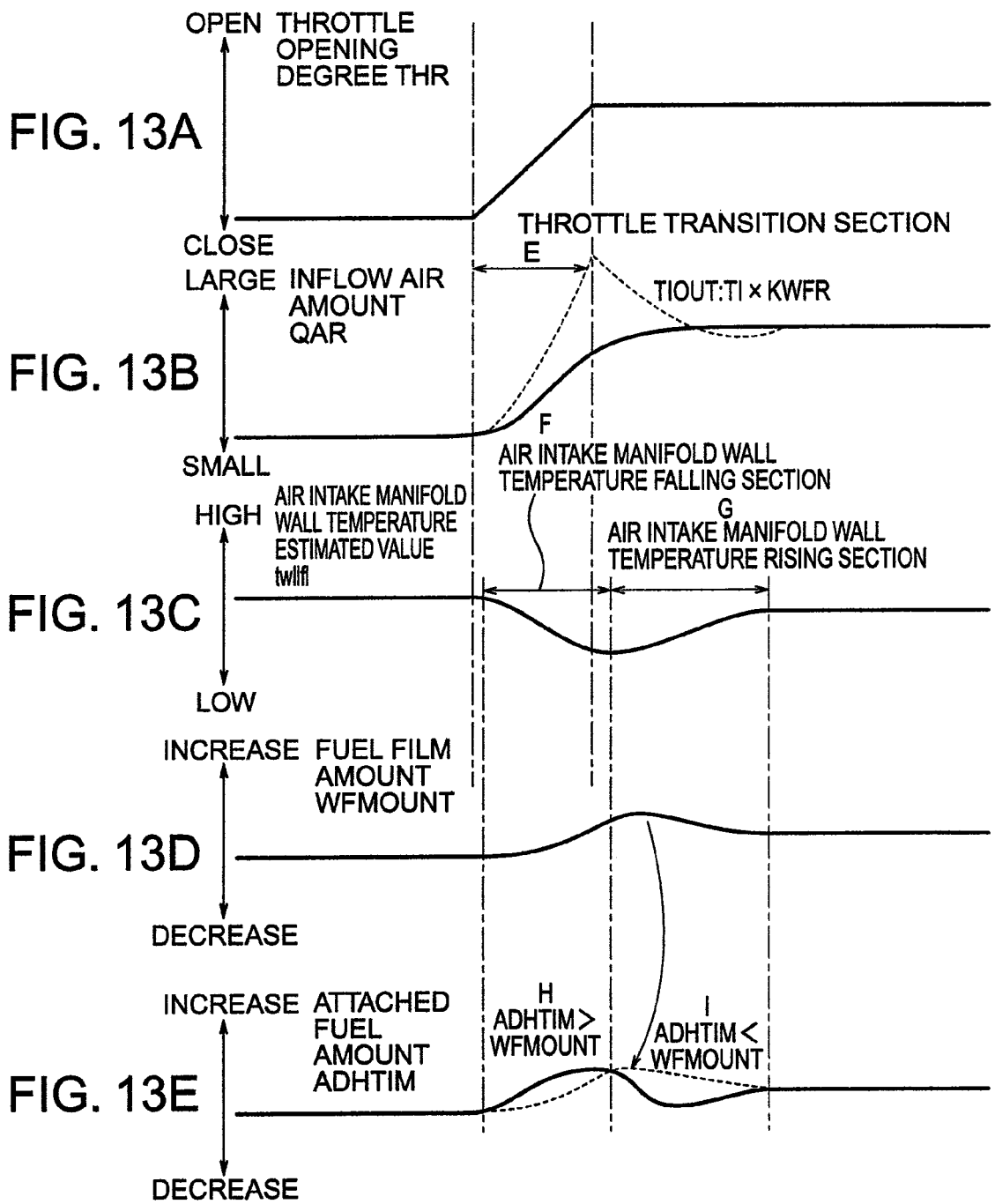
FIGS. 13A to 13E are time charts expressing one example of each of parameter behaviors at a time when the fuel control system corresponding to the subject of the present invention controls the engine.

FIG. 13A shows a behavior of the throttle opening degree THR, FIG. 13B shows a behavior of the intake air amount QAR, FIG. 13C shows a behavior of the air intake manifold wall temperature estimated value TWLLFLO, FIG. 13D shows a behavior of the fuel film amount WFMOUNT, and FIG. 13E shows a behavior of the adhered fuel amount ADHTIM.

A section E corresponds to a transition section in which the throttle opening degree THR is changed, and a broken line a corresponds to an executed injection fuel pulse width corrected in accordance with the method of the present invention.

A section F corresponds to an air intake manifold wall temperature falling section, and the adhered fuel amount ADHTIM becomes more than the fuel film amount WFMOUNT as shown by a section H.

A section G corresponds to an air intake manifold wall temperature rising section, and the fuel film amount WFMOUNT becomes more than the adhered fuel amount ADHTIM as shown by a section I.

Figure 14:
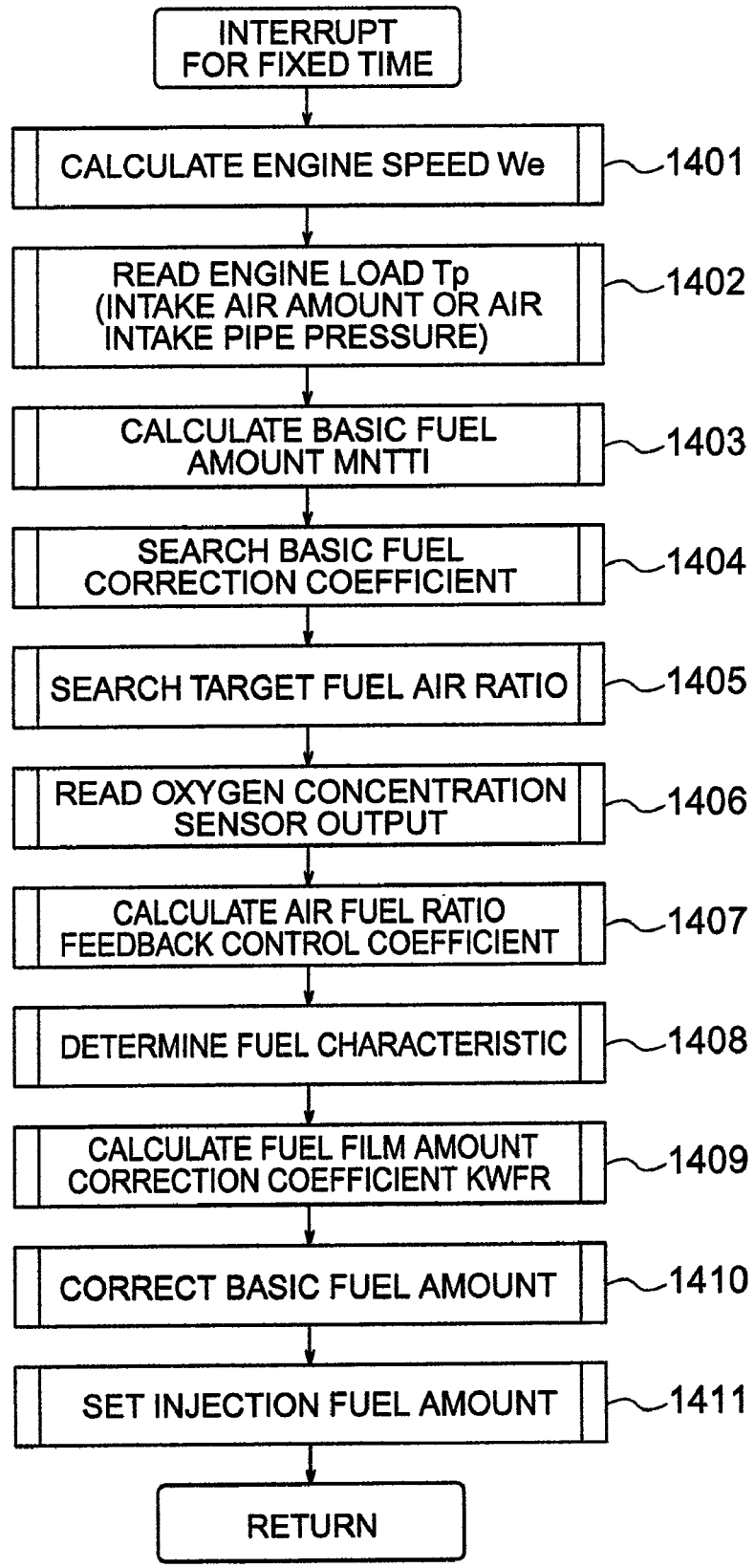
FIG. 14 is a flow chart showing a control flow of the engine control system of the engine to which the air intake manifold wall temperature estimating apparatus and the fuel control system in accordance with the present invention are applied.

FIG. 14 shows a control flow of the engine control system 50 of the engine 10 to which the air intake manifold wall temperature estimating apparatus and the fuel control system in accordance with the present invention are applied.

First, a step 1401 calculates the engine speed Ne. Further, a step 1402 reads an engine load Tp. In the present embodiment, the engine load Tp is obtained by dividing an air intake pipe negative pressure PM or the intake air amount QAR by the engine speed Ne.

Next, a step 1403 calculates the basic fuel amount MNTTI. A step 1404 searches a correction coefficient of the basis fuel amount MNTTI on the basis of the engine speed Ne and the engine load Tp. A step 1405 searches a demanded target air fuel ratio. A step 1406 reads an output of the oxygen concentration sensor 24, and a step 1407 carries out an air fuel ratio feedback on the basis of the oxygen concentration sensor output in such a manner that an exhaust gas air fuel ratio comes to the target air fuel ratio, and calculates an air fuel ratio feedback coefficient.

A step 1408 detects a rotating speed fluctuation on the basis of the engine speed Ne, and determines the fuel characteristic.

A step 1409 calculates the fuel film correction coefficient KWFR with respect to the basic fuel amount MNTTI.

A step 1410 applies the air fuel ratio feedback coefficient and the fuel film correction coefficient KWFR to the basic fuel amount MNTTI. Further, a step 1411 sets the injected fuel amount applied the correction to the fuel injecting means.

Figure 15:
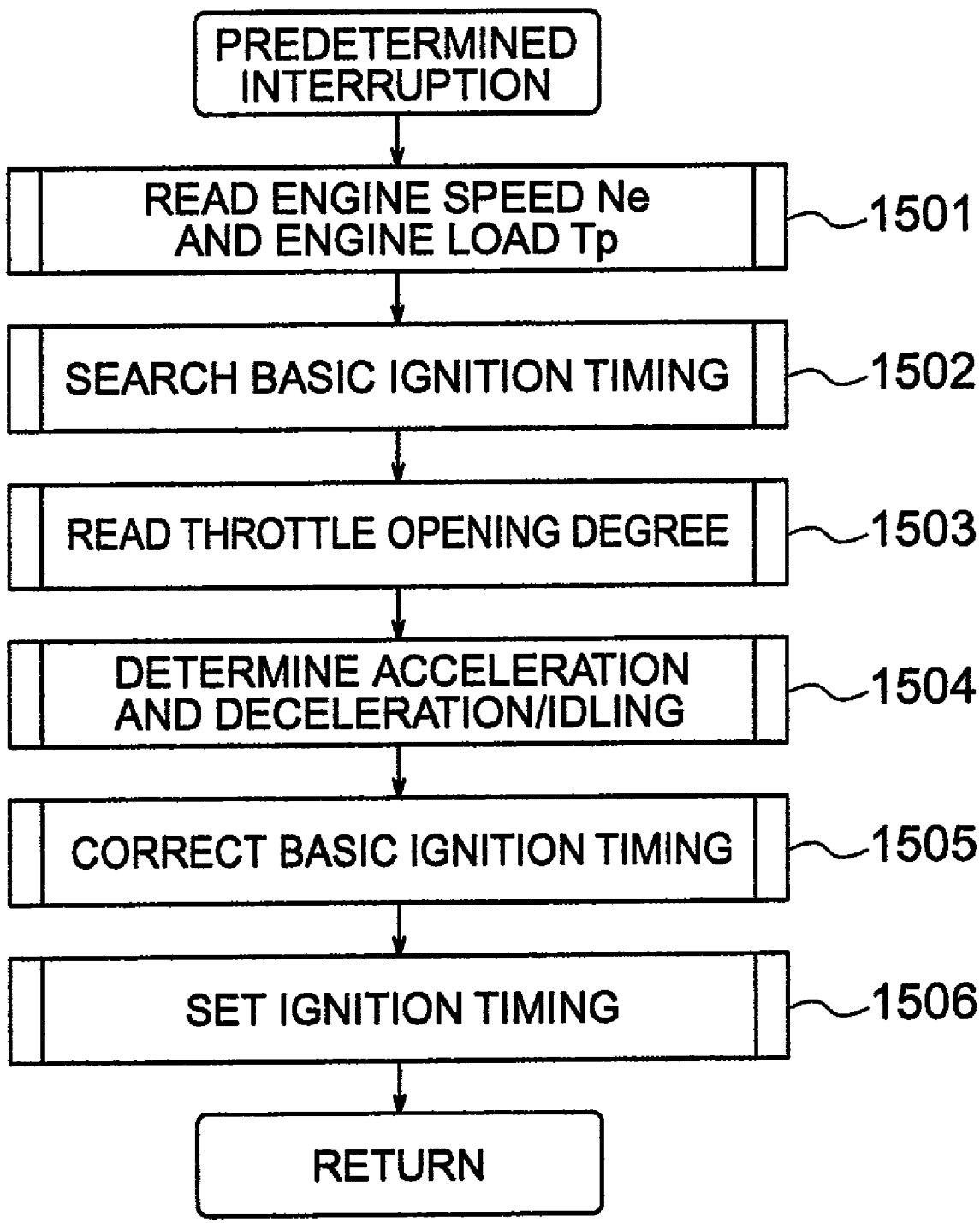
FIG. 15 is a detailed flow chart of an ignition timing calculation relation of the engine control system.

FIG. 15 shows one example of a detailed flow chart of an ignition timing calculation relation of the engine control system 50.

First, a step 1501 reads the engine speed Ne and the engine load Tp. A step 1502 searches the basic ignition timing on the basis of the engine speed Ne and the engine load.

A step 1503 reads the throttle opening degree, and a step 1504 determines the engine state for determining the acceleration or deceleration and the idling.

Further, a step 1505 calculates the ignition correction amount on the basis of the determined state, and reflects to the basic ignition timing, and a step 1506 sets to the igniting means.

In this case, in FIGS. 14 and 15, there are shown the example in which the fuel calculation and the ignition timing calculation are calculated at the different interrupting periods, however, the calculating may be carried out at the same timing. Further, the interruption is carried out at the fixed time, however, may be carried out at a timing which is synchronized with the angle of rotation of the engine.

Figure 16:
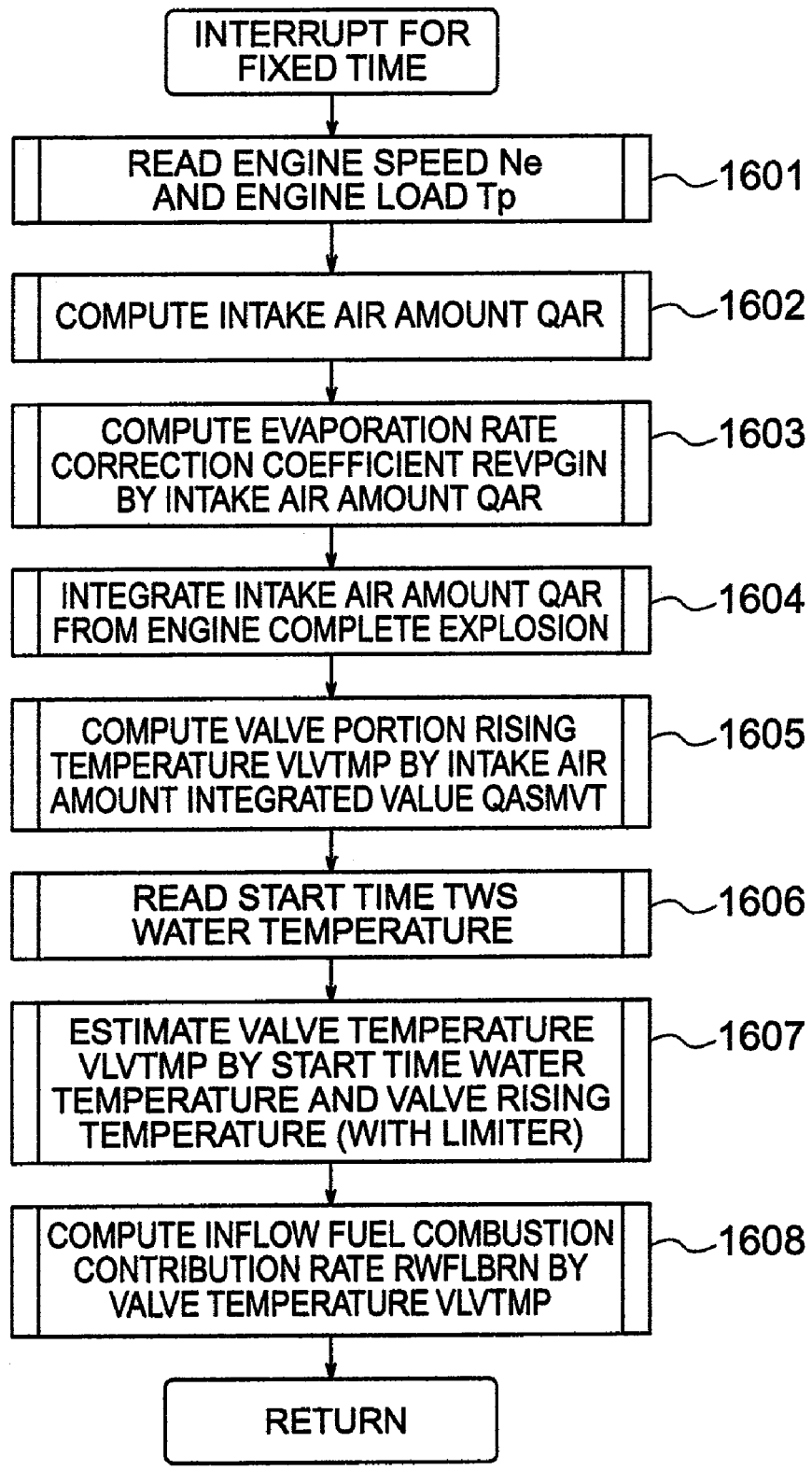
FIG. 16 is a detailed flow chart of an intake air amount to an inflow fuel combustion contribution rate computation by the air intake manifold wall temperature estimating and fuel film correction computing means in accordance with the present embodiment.

FIG. 16 shows one example of a detailed flow chart of a computation of the intake air amount to the inflow fuel combustion contribution rate by the air intake manifold wall temperature estimating and fuel film correction computing means 110.

First, a step 1601 reads the engine speed Ne and the engine load Tp. A step 1602 computes the intake air flow rate QAR. In this case, although mentioned above, the present step is not necessary in the system measuring the intake air amount by the thermal type air flow meter or the like.

A step 1603 searches the evaporation rate correction coefficient REVPGIN on the basis of the intake air amount QAR. A step 1604 integrates the intake air amount after the engine starts (after a complete explosion). In other words, the intake air amount integrated value QASMVT is computed.

Next, a step 1605 searches the valve rising temperature VLVTM on the basis of the intake air amount integrated value QASMVT. A step 1606 reads the start time water temperature TWS, and a step 1607 calculates the valve temperature VLVTMP on the basis of the start time water temperature TWS and the valve rising temperature VLVTM. In this case, an upper limit restriction value is set in the valve temperature. A step 1608 searches the inflow fuel combustion contribution rate RWFLBRN on the basis of the valve temperature VLVTMP.

FIG. 17 shows one example of a detailed flow chart of the air intake manifold wall temperature estimation by the air intake manifold wall temperature estimating portion 209.

First, a step 1701 reads the engine water temperature TW, and the valve temperature VLVTMP mentioned above. A step 1702 applies a weighted average to each of the engine water temperature TW and the valve temperature VLVTMP. A step 1703 reads the intake air temperature TA, the intake air amount QAR, the weighted average value of the engine water temperature, the weighted average value of the valve temperature VLVTMP, the previous fuel film amount wfmont, the fuel adhesion amount ADHTIM, and the engine start time water temperature TWS, and a step 1704 estimates the air intake manifold wall temperature estimated value (the estimated air intake manifold wall temperature) TWLLFL on the basis of them.

FIG. 18 shows one example of a detailed flow chart of the fuel film amount parameter computation by the fuel film amount parameter computing portion 210.

First, a step 1801 reads the air intake manifold wall temperature estimated value TWLLFL mentioned above. Next, a step 1802 reads an independently determined fuel characteristic determined value, and a step 1803 selects each of the fuel adhesion rate map, the fuel film amount upper limit value map and the evaporation rate map in correspondence to the fuel characteristic.

Further, a step 1804 searches the fuel adhesion rate map, the fuel film amount upper limit map and the evaporation rate map selected in correspondence to the fuel characteristic, on the basis of the air intake manifold wall temperature estimated value TWLLFL, and decides respective parameters (the fuel adhesion rate RADHES, the fuel film amount upper limit value MSFLHLM and the fuel evaporation rate REVAPO).

Figure 19:
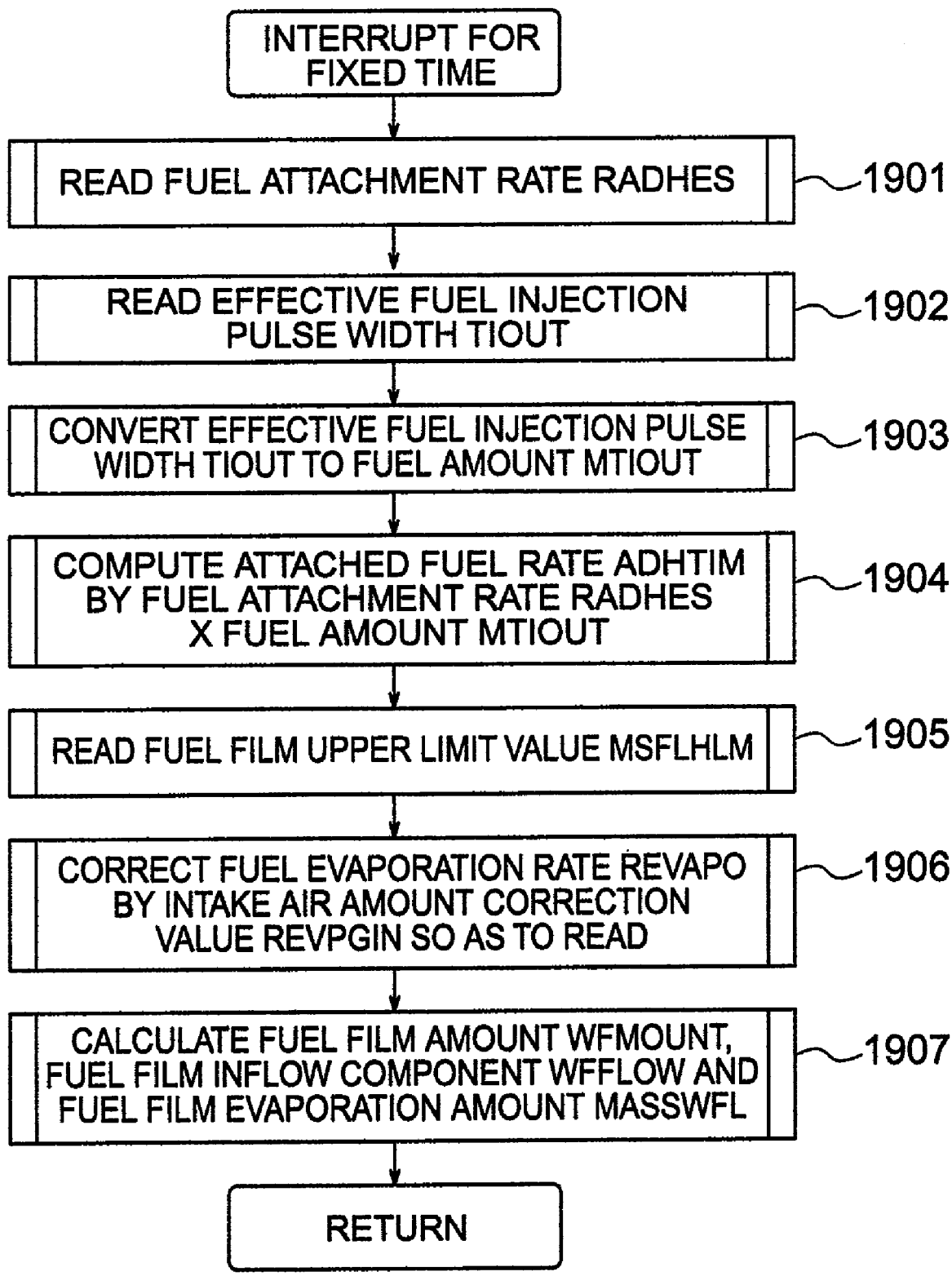
FIG. 19 is a detailed flow chart of a fuel film amount computation by the air intake manifold wall temperature estimating and fuel film correction computing means in accordance with the present embodiment.

FIG. 19 shows one example of a detailed flow chart of the fuel film amount computation by the air intake manifold wall temperature estimating and fuel film correction computing means 110.

First, a step 1901 reads the fuel adhesion rate RADHES. A step 1902 reads the effective fuel injection pulse width TIOUT, and a step 1903 converts the pulse width into the fuel amount MTIOUT. A step 1904 multiplies the fuel adhesion rate RADHES and the fuel amount MTIOUT, and computes the adhered fuel amount ADHTIM to the fuel film.

Next, a step 1905 reads the fuel film amount upper limit value MSFLHLM. A step 1906 compensates the fuel evaporation rate REVAPO by the intake air amount correction value REVPGIN.

Further, a step 1907 computes the fuel film amount WEMOUNT, the fuel film inflow component WFFLOW and the fuel film evaporation amount MASSWFL on the basis of the adhered fuel amount ADHTIM to the fuel film, the fuel film amount upper limit value MSFLHLM, and the fuel evaporation rate REVAPO applied the correction of the intake air amount.

Figure 20:
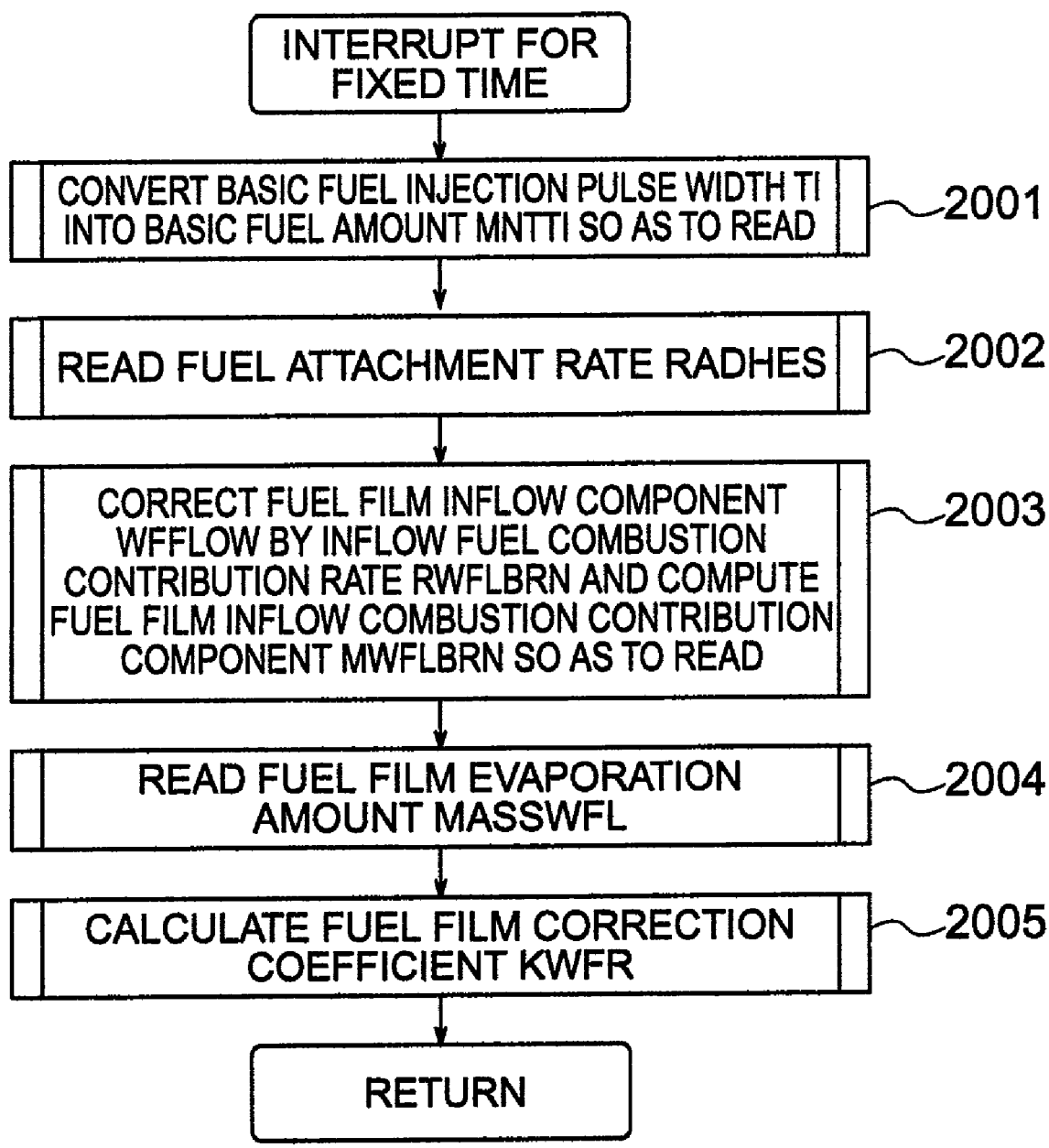
FIG. 20 is a detailed flow chart of a fuel film correction coefficient computation by a fuel film correction coefficient computing portion in accordance with the present embodiment.

FIG. 20 shows one example of a detailed flow chart of the fuel film correction coefficient computation by the fuel film correction coefficient computing portion 220.

First, a step 2001 converts the basic fuel injection pulse width TI into the basic fuel amount MNTTI. A step 2002 reads the fuel adhesion rate RADHES.

Next, a step 2003 multiplies the fuel film inflow component WFFLOW by the fuel film inflow fuel combustion contribution rate RWFLBRN so as to compute the fuel film inflow combustion contribution component MWFLBRN. A step 2004 reads the fuel film evaporation amount MASSWFL.

Further, a step 2005 calculates the fuel film correction coefficient KWFR on the basis of the expression (9) mentioned above, from the basic fuel amount MNTTI, the fuel adhesion rate RADHES, the fuel film inflow combustion contribution component MWFLBRN and the fuel film evaporation amount MASSWFL.

Figure 21:
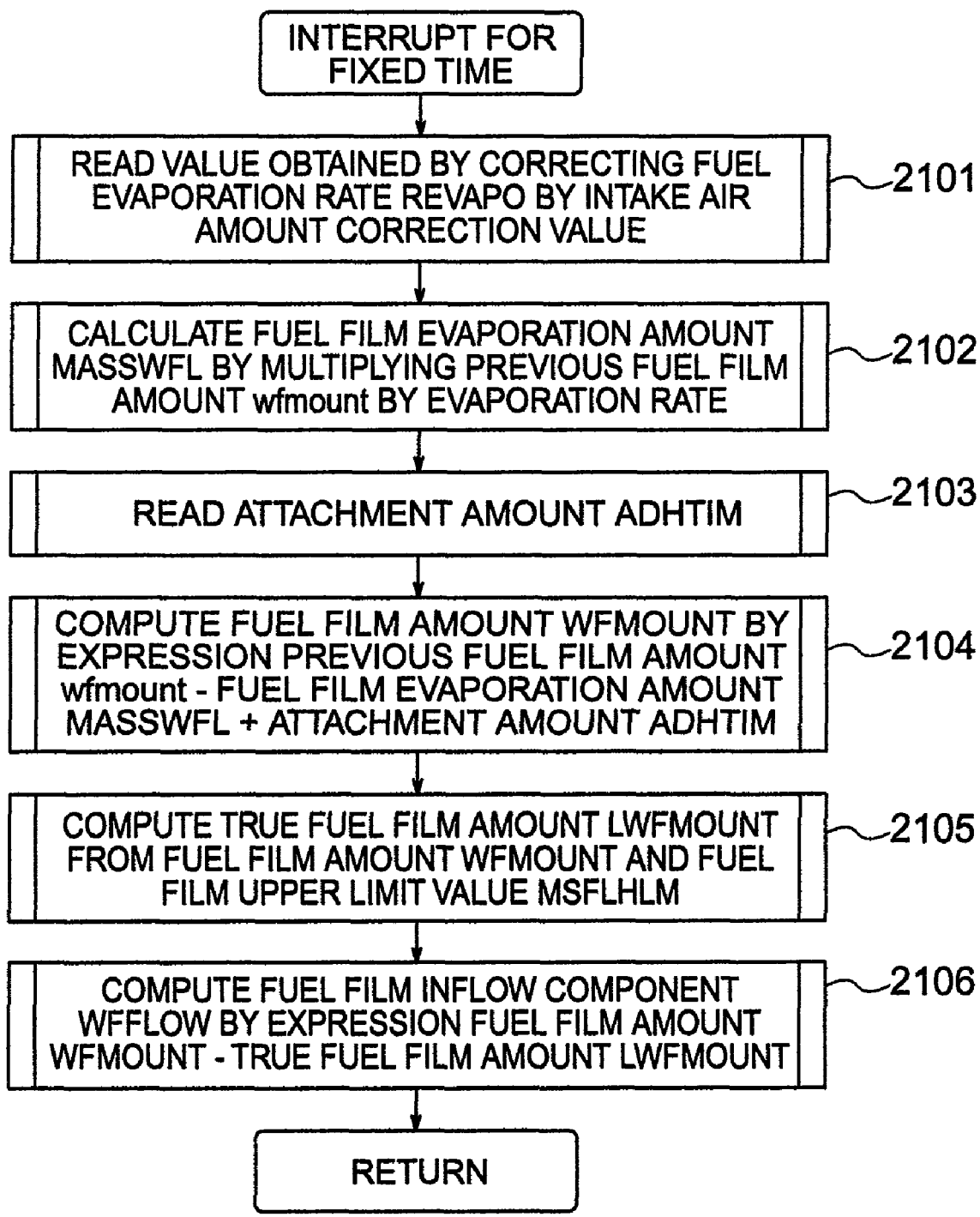
FIG. 21 is a detailed flow chart of a fuel film amount computation by a fuel film amount computing member in accordance with the present embodiment.

FIG. 21 shows one example of a detailed flow chart of the fuel film amount computation by the fuel film amount computing member 217 shown in FIG. 9.

First, a step 2101 reads the fuel evaporation rate (REVAPO×REVPGIN) applied the intake air amount correction. A step 2102 multiplies the previous fuel film amount wfmount by the corrected fuel evaporation rate (REVAPO×REVPGIN) so as to calculate the fuel film evaporation amount MASSWFL.

Next, a step 2103 reads the adhesion amount ADHTIM. A step 2104 subtracts the fuel film evaporation amount MASSWFL from the previous fuel film amount wfmount, and adds the adhesion amount ADHTIM thereto, and computes the current fuel film amount WFMOUNT.

A step 2105 computes the true fuel film amount LWFMOUNT by comparing the fuel film amount WFMOUNT with the fuel film amount upper limit value MSFLHLM mentioned above.

Further, a step 2106 computes the fuel film inflow component WFFLOW by subtracting the true fuel film amount LWFMOUNT from the fuel film amount WFMOUNT.

Figure 22:
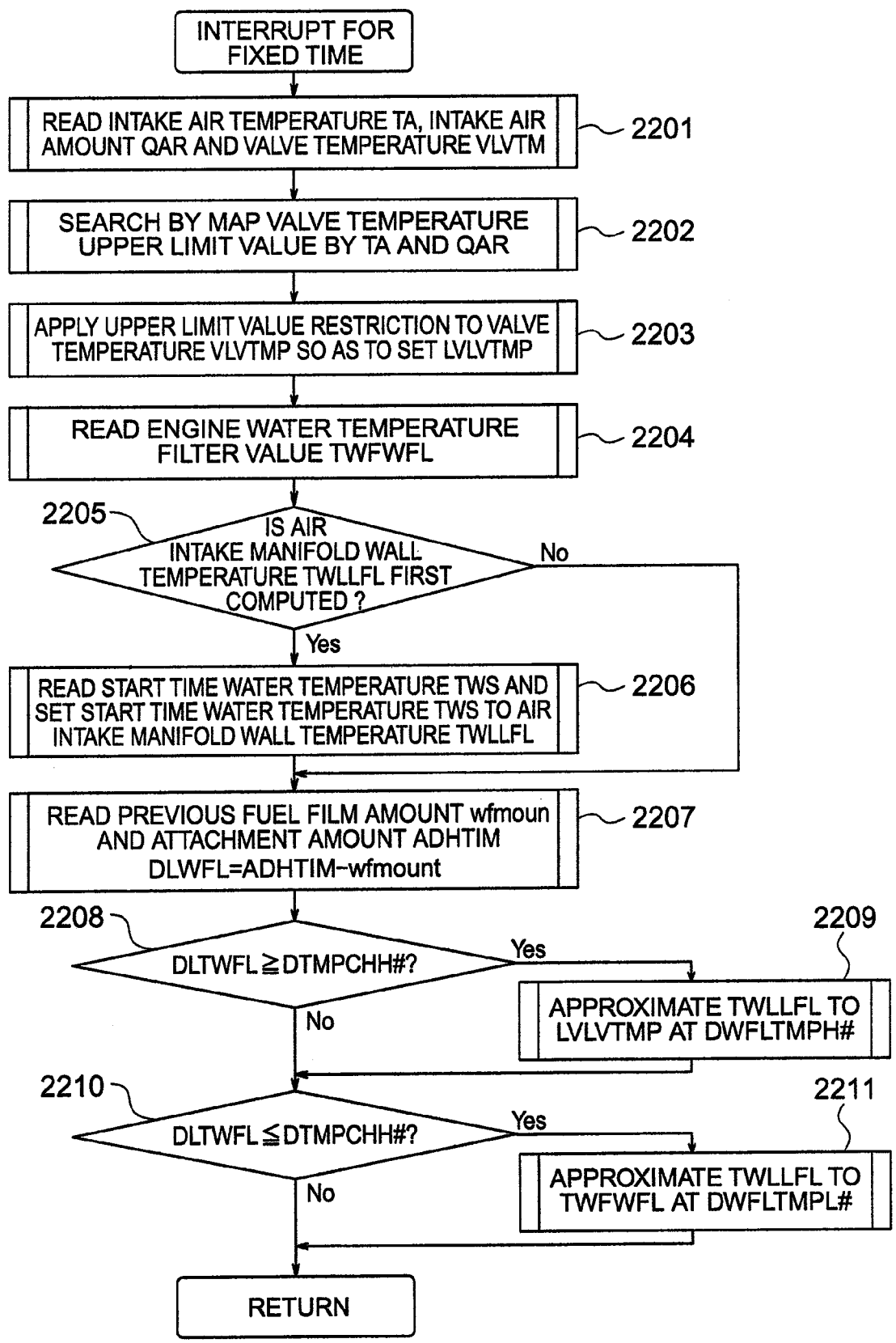
FIG. 22 is a detailed flow chart of an air intake manifold wall temperature estimation by the air intake manifold wall temperature estimating means in accordance with the present embodiment.

FIG. 22 shows one example of a detailed flow chart of the air intake manifold wall temperature estimation by the air intake manifold wall temperature estimating means in accordance with the embodiment shown in FIG. 10.

First, a step 2201 reads the intake air temperature TA, the intake air amount QAR and the valve temperature VLVTMP. A step 2202 searches by map the valve temperature upper limit value on the basis of the intake air temperature TA and the intake air amount QAR. A step 2203 applies the upper limit value restriction by the valve temperature upper limit value to the read valve temperature VLVTMP, and sets it to the valve temperature LVLVTMP applied the upper limit value restriction. Further, a step 2204 reads the engine water temperature filter value TWFWFL.

Next, a step 2205 determines whether or not the calculation of the estimated air intake manifold wall temperature TWLLFL is the first time. If it is the first time, a step 2206 reads the start time water temperature TWS, and sets the start time water temperature TWS to the initial time estimated air intake manifold wall temperature TWLLFL.

A step 2207 reads the previous fuel film amount wfmount and the adhesion amount ADHTIM, and calculates the difference DLTWFL of the previous fuel film amount wfmount on the basis of the adhesion amount ADHTIM.

A step 2208 determines whether or not the difference DLTWFL is equal to or more than the first predetermined value DTMPCHH. If the difference DLTWFL is equal to or more than the first predetermined value DTMPCHH, a step 2209 approximates the estimated air intake manifold wall temperature TWLLFL to the upper limit value restricted valve temperature LVLVTMP at the first predetermined temperature step component DWFLTPH.

A step 2210 determines whether or not the difference DLTWFL is equal to or more than the second predetermined value DTMPCHL. If the difference DLTWFL is equal to or less than the second predetermined value DTMPCHL, a step 2211 approximates the estimated air intake manifold wall temperature TWLLFL to the engine water temperature filter value TWFWFL at the second predetermined temperature step DWFLTPL component.

Figure 23:
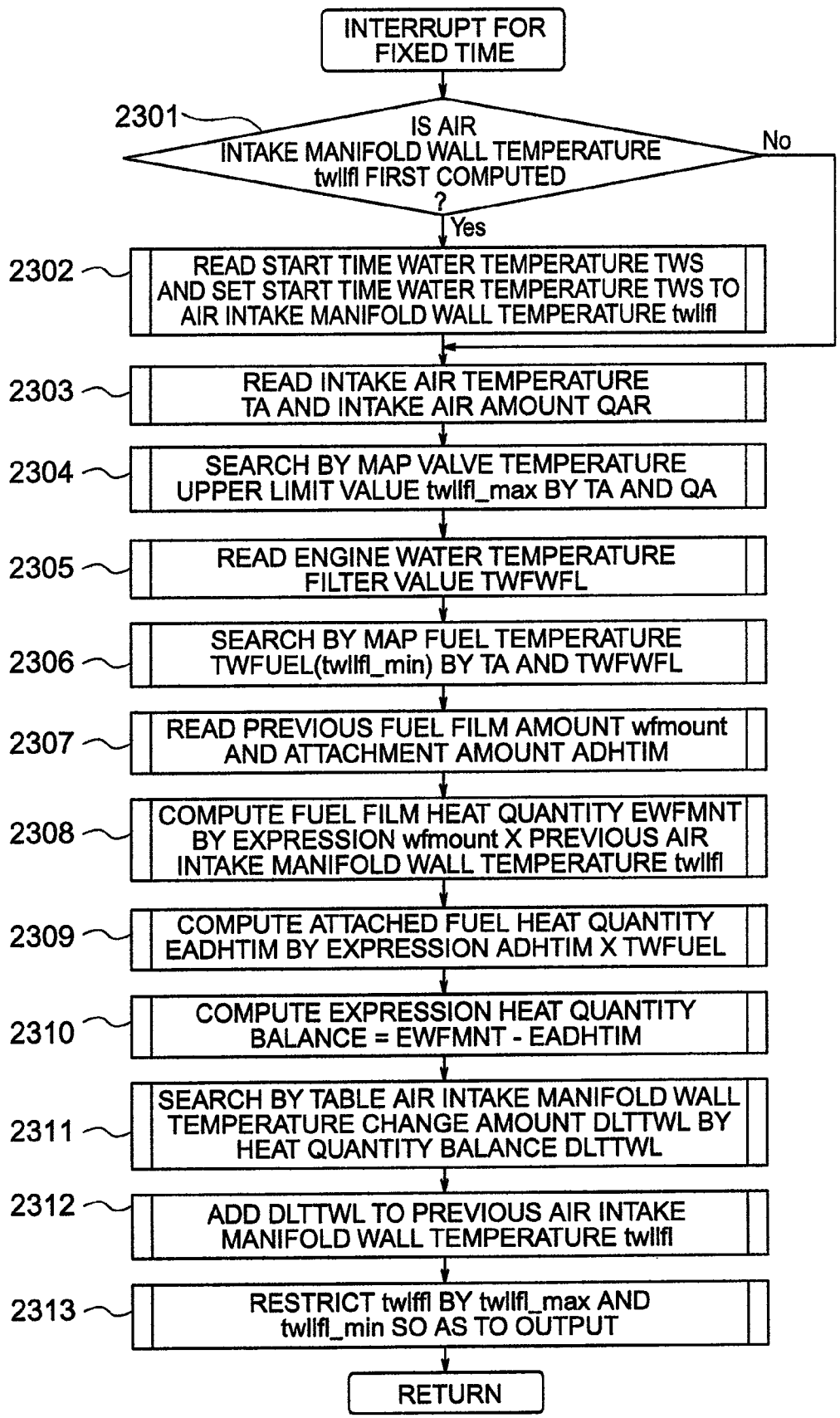
FIG. 23 is a detailed flow chart of the air intake manifold wall temperature estimation by an air intake manifold wall temperature estimating means in accordance with the other embodiment.

FIG. 23 shows one example of a detailed flow chart of the air intake manifold wall temperature estimation by the air intake manifold wall temperature estimating means in accordance with the embodiment shown in FIG. 11.

First, a step 2301 determines whether or not the calculation of the estimated air intake manifold wall temperature TWLLFL is the first time. If it is the first time, a step 2302 reads the start time water temperature TWS, and sets it to the first estimated air intake manifold wall temperature TWLLFL.

Next, a step 2303 reads the intake air temperature TA and the intake air amount QAR. Further, a step 2304 searches by map the valve temperature upper limit value TWLLFLmax on the basis of the intake air temperature TA and the intake air amount QAR.

Next, a step 2305 reads the engine water temperature filter value TWFWFL. A step 2306 searches by map the fuel temperature on the basis of the intake air temperature an the engine water temperature filter value.

Next, a step 2307 reads the previous fuel film amount wfmount and the adhesion amount ADHTIM.

Further, a step 2308 computes the fuel film heat quantity EWFMNT by multiplying the previous fuel film amount wfmount and the previous air intake manifold wall temperature twllfl. A step 2309 computes the heat quantity EADHTIM of the adhered fuel by multiplying the adhesion amount ADHTIM and the fuel temperature TWFUEL.

Next, a step 2310 computes the heat quantity balance DLTEWF by subtracting the adhered fuel heat quantity EADHTIM from the fuel film heat quantity EWFMNT.

Further, a step 2311 searches by table the air intake manifold wall temperature change amount DLTTWL on the basis of the heat quantity balance DLTEWF.

A step 2312 adds the air intake manifold wall temperature change amount DLTTWL to the previous air intake manifold wall temperature twllfl so as to set to the base value of the current estimated air intake manifold wall temperature TWLLFL.

Further, a step 2313 applies the upper and lower limit restriction to the base value of the estimated air intake manifold wall temperature TWLLFL by the valve temperature upper limit value TWLLFLmax and the valve temperature lower limit value TWLLFLmin by the fuel temperature TWFUEL so as to set to the final estimated air intake manifold wall temperature TWLLFL.

Figure 24:
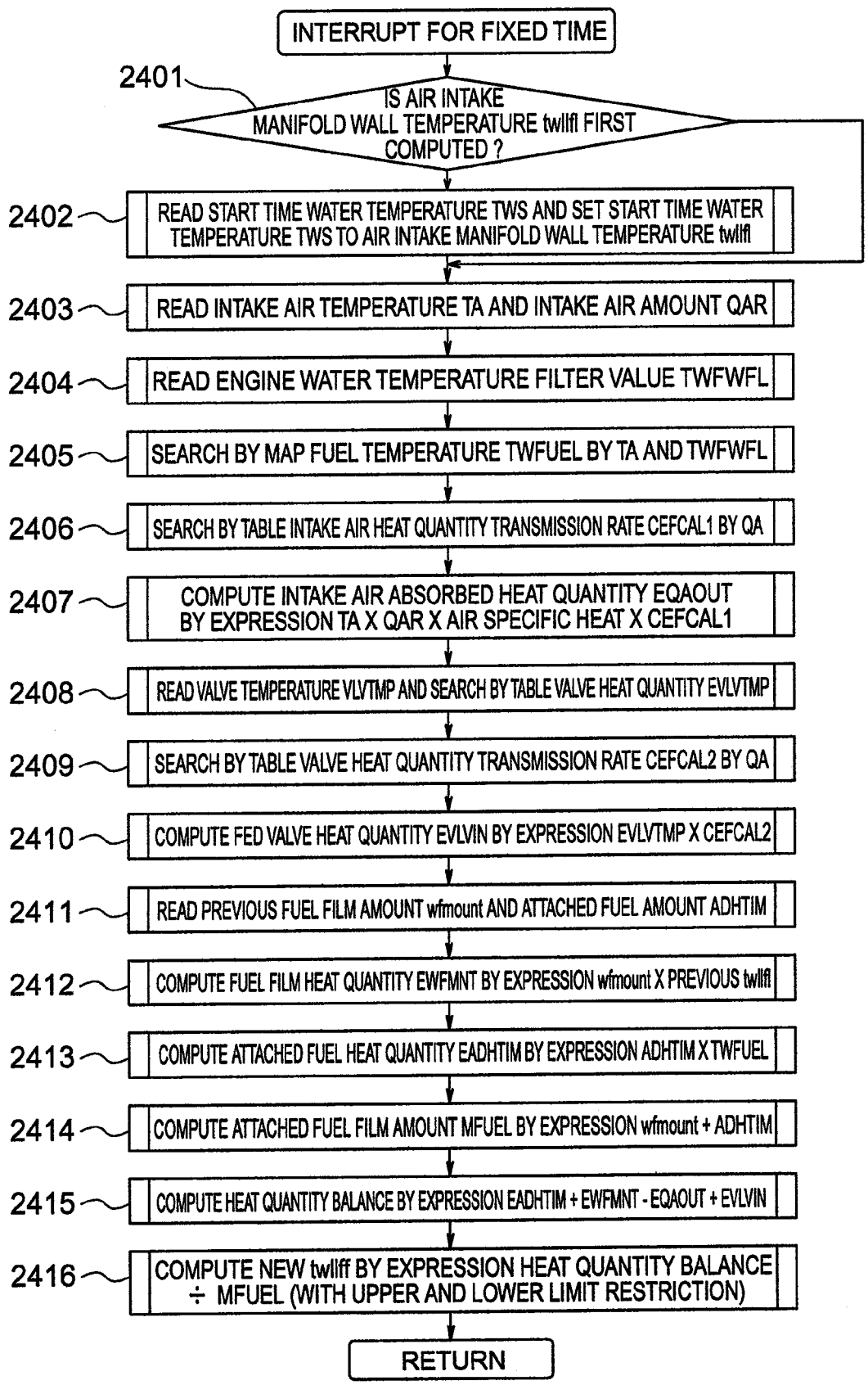
FIG. 24 is a detailed flow chart of the air intake manifold wall temperature estimation by an air intake manifold wall temperature estimating means in accordance with further the other embodiment.

FIG. 24 shows one example of a detailed flow chart of the air intake manifold wall temperature estimation by the air intake manifold wall temperature estimating means in accordance with the embodiment shown in FIG. 12.

First, a step 2401 determines whether or not the calculation of the estimated air intake manifold wall temperature TWLLFL is the first time. If it is the first time, a step 2402 reads the start time water temperature TWS, and sets it to the first time air intake manifold wall temperature TWLLFL.

Next, a step 2403 reads the intake air temperature TA and the intake air amount QAR. A step 2404 reads the engine water temperature filter value TWFWFL. Further, a step 2405 searches by map the fuel temperature TWFUEL on the basis of the intake air temperature TA and the engine water temperature filter value WFWFL.

Next, a step 2406 searches by table the intake air heat quantity transmission rate CEFCAL1 on the basis of the intake air amount QAR. A step 2407 computes the intake air absorbing heat quantity EQAOUT by multiplying the intake air temperature TA, the intake air amount QAR, the intake air heat quantity transmission rate CEFCAL1 and the air specific heat.

Next, a step 2408 reads the valve temperature VLVTMP, and searches by table the valve heat quantity EVLVTMP on the basis of the valve temperature VLVTMP.

Next, a step 2409 searches by table the valve heat quantity transmission rate CEFCAL2 on the basis of the intake air amount QAR. A step 2410 computes the fed valve heat quantity EVLVIN by multiplying the valve heat quantity EVLVTMP and the valve heat quantity transmission rate CEFCAL2.

Next, a step 2411 reads the previous fuel film amount wfmount, and the adhered fuel amount ADHTIM. A step 2412 computes the fuel film heat quantity EWFMNT by multiplying the previous fuel film amount wfmount and the previous air intake manifold wall temperature twllfl. A step 2413 computes the adhered fuel heat quantity EADHTIM by multiplying the adhesion amount ADHTIM and the fuel temperature TWFUEL.

Next, a step 2414 computes the adhered fuel film amount MFUEL after the fuel is adhered, by adding the previous fuel film amount wfmount and the adhered fuel amount ADHTIM.

Next, a step 2415 computes the heat quantity balance DLTEWF by adding the adhered fuel heat quantity EADHTIM, the fuel film heat quantity EWFMNT and the fed valve heat quantity EVLIN, and thereafter subtracting the absorbed intake air absorbing heat quantity EQAOUT.

Further, a step 2416 computes the new estimated air intake manifold wall temperature TWLLFL by dividing the heat quantity balance DLTEWF by the adhered fuel film amount MFEL. In this case, the estimated air intake manifold wall temperature TWLLFL is applied the upper and lower limit values defined by the constant or the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A fuel control system of an internal combustion engine, comprising:
    a fuel adhesion rate computing means computing a fuel adhesion rate at which an injection fuel is adhered to an air intake pipe on the basis of a representative temperature at a position at which the injection fuel is adhered;
    a fuel evaporation rate computing means computing a fuel evaporation rate of the air intake pipe adhered fuel on the basis of the representative temperature of the position at which the injection fuel is adhered;
    a fuel adhesion amount computing means computing a fuel adhesion amount on the basis of the fuel injection amount and the fuel adhesion rate computed by said fuel adhesion rate computing means;
    a fuel film amount computing means computing a fuel film amount of the air intake pipe on the basis of the fuel adhesion amount computed by the fuel adhesion amount computing means and the fuel evaporation rate computed by said fuel evaporation rate computing means;
    a means for computing an applied heat quantity applied to the fuel adhered to the air intake pipe;
    a means for computing an absorbed heat quantity absorbed from the fuel adhered to the air intake pipe;
    a heat quantity balance computing means computing a balance of the applied heat quantity given to said fuel and the absorbed heat quantity absorbed from said fuel;
    an air intake manifold wall temperature estimating means estimating the representative temperature of the position to which said injection fuel is adhered, on the basis of the heat quantity balance computed by said heat quantity balance computing means;
    a fuel film correction coefficient computing means computing a fuel film correction coefficient on the basis of the fuel film amount computed by said fuel film amount computing means; and
    a fuel injection amount correcting means correcting the fuel injection amount on the basis of the fuel film correction coefficient computed by said fuel film correction coefficient computing means.

2. A fuel control system of an internal combustion engine as claimed in claim 1, wherein the balance of said applied heat quantity and said absorbed heat quantity includes a heat quantity of the intake air amount of the internal combustion engine.

3. A fuel control system of an internal combustion engine as claimed in claim 1, wherein the balance of said applied heat quantity and said absorbed heat quantity includes a heat quantity of the fuel.

4. A fuel control system of an internal combustion engine as claimed in claim 1, wherein the balance of said applied heat quantity and said absorbed heat quantity includes a heat quantity of an engine cooling water.

5. A fuel control system of an internal combustion engine as claimed in claim 1, wherein the balance of said applied heat quantity and said absorbed heat quantity includes a heat quantity near the air intake valve.

6. A fuel control system of an internal combustion engine as claimed in claim 5, wherein the heat quantity near said valve is computed by a heat quantity transmission rate of the temperature near said valve determined on the basis of the temperature near the valve and the intake air amount of the internal combustion engine from an integrated value of the intake air amount of the internal combustion engine.

7. A fuel control system of an internal combustion engine, comprising:
   a fuel adhesion rate computing means computing a fuel adhesion rate at which an injection fuel is adhered to an air intake pipe on the basis of a representative temperature at a position at which the injection fuel is adhered;
   a fuel evaporation rate computing means computing a fuel evaporation rate of the air intake pipe adhered fuel on the basis of the representative temperature of the position at which the injection fuel is adhered;
   a fuel adhesion amount computing means computing a fuel adhesion amount on the basis of the fuel injection amount and the fuel adhesion rate computed by said fuel adhesion rate computing means;
   a fuel film amount computing means computing a fuel film amount of the air intake pipe on the basis of the fuel adhesion amount computed by the fuel adhesion amount computing means and the fuel evaporation rate computed by said fuel evaporation rate computing means;
   an engine water temperature detecting means detecting an engine water temperature;
   a valve temperature computing means computing a temperature of the air intake valve;
   a means for comparing an amount of the fuel adhered to the air intake pipe with an amount of the fuel already adhered to the air intake pipe;
   an air intake manifold wall temperature estimating means estimating a representative temperature of the position to which said injection fuel is adhered, on the basis of said engine water temperature, the temperature of said air intake valve and said result of comparison;
   a fuel film correction coefficient computing means computing a fuel film correction coefficient on the basis of the fuel film amount computed by said fuel film amount computing means; and
   a fuel injection amount correcting means correcting the fuel injection amount on the basis of the fuel film correction coefficient computed by said fuel film correction coefficient computing means.

8. A fuel control system of an internal combustion engine as claimed in claim 7, wherein the air intake manifold wall temperature estimating means has a means for storing a predetermined temperature width with respect to said result of comparison, a means for deciding a reaching temperature to any one of an engine water temperature near said adhered position and the temperature near said air intake valve on the basis of said result of comparison, and a means for approximating to said decided reaching temperature in increments of said predetermined temperature width.

9. A fuel control system of an internal combustion engine as claimed in claim 8, wherein the predetermined temperature width with respect to said result of comparison is constituted by a stored parameter group stored in correspondence to a magnitude of said result of comparison.

\* \* \* \* \*